(12) United States Patent
McDaniel et al.

(10) Patent No.: US 12,421,331 B2
(45) Date of Patent: Sep. 23, 2025

(54) SYSTEMS AND METHODS FOR CHROMIUM CATALYST ACTIVATION

(71) Applicant: Chevron Phillips Chemical Company LP, The Woodlands, TX (US)

(72) Inventors: Max P. McDaniel, Bartlesville, OK (US); Zhihui Gu, Kingwood, TX (US); Ted H. Cymbaluk, Seabrook, TX (US); Anand Ramanathan, Bartlesville, OK (US); Julian Abrego, Pasadena, TX (US); Taryn Huber, Pasadena, TX (US); Ravindranath Koyyalagunta, Pasadena, TX (US); Marlon L. Jordan, Pasadena, TX (US); David W. Dockter, The Woodlands, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 18/939,676

(22) Filed: Nov. 7, 2024

(65) Prior Publication Data

US 2025/0154298 A1    May 15, 2025

Related U.S. Application Data

(60) Provisional application No. 63/597,370, filed on Nov. 9, 2023.

(51) Int. Cl.
*C08F 10/02* (2006.01)
*B01J 37/14* (2006.01)
*C08F 4/78* (2006.01)

(52) U.S. Cl.
CPC .................. *C08F 10/02* (2013.01)

(58) Field of Classification Search
USPC ................ 502/106, 256, 514; 422/116, 139; 526/106
See application file for complete search history.

(56) References Cited

U.S. PATENT DOCUMENTS 3,242,099 A    3/1966   Manyik
3,248,179 A    4/1966   Norwood
(Continued)

FOREIGN PATENT DOCUMENTS

DE    10257740 A1    6/2004
EP      789810 A     3/1997
(Continued)

OTHER PUBLICATIONS

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.
(Continued)

*Primary Examiner* — Fred M Teskin
(74) *Attorney, Agent, or Firm* — Merchant & Gould P.C.

(57) ABSTRACT

Processes for producing activated chromium catalysts such as chromium/silica catalysts and titanated chromium/silica catalysts are disclosed, and these processes utilize a multi-step process involving exposure to inert and oxidizing atmospheres at specific temperature conditions. The resulting activated chromium catalysts have unexpectedly high melt index potential and can produce ethylene-based polymers with lower gel counts in addition to higher melt indices. Related activation systems are provided in which the fluidizing gas entering the fluidized bed vessel can be adjusted between an inert gas, an oxygen-containing gas, or a mixture of the inert gas and the oxygen-containing gas to minimize or prevent exotherms.

25 Claims, 11 Drawing Sheets

(56) References Cited

U.S. PATENT DOCUMENTS

| | | |
|---|---|---|
| 4,147,849 A | 4/1979 | Liu |
| 4,151,122 A | 4/1979 | Mcdaniel |
| 4,489,172 A | 12/1984 | Mcdaniel |
| 4,501,885 A | 2/1985 | Sherk |
| 4,588,790 A | 5/1986 | Jenkins, III |
| 4,794,096 A | 12/1988 | Ewen |
| 4,808,561 A | 2/1989 | Welborn, Jr. |
| 5,093,300 A | 3/1992 | Vogels |
| 5,352,749 A | 10/1994 | Dechellis |
| 5,372,983 A | 12/1994 | Mullen |
| 5,436,304 A | 7/1995 | Griffin |
| 5,565,175 A | 10/1996 | Hottovy |
| 5,575,979 A | 11/1996 | Hanson |
| 5,576,259 A | 11/1996 | Hasegawa |
| 5,807,938 A | 9/1998 | Kaneko |
| 5,919,983 A | 7/1999 | Rosen |
| 6,239,235 B1 | 5/2001 | Hottovy |
| 6,262,191 B1 | 7/2001 | Hottovy |
| 6,833,415 B2 | 12/2004 | Kendrick |
| 7,294,599 B2 | 11/2007 | Jensen |
| 7,531,606 B2 | 5/2009 | Hendrickson |
| 7,598,327 B2 | 10/2009 | Shaw |
| 7,601,665 B2 | 10/2009 | Mcdaniel |
| 7,615,510 B2 | 11/2009 | Mcdaniel |
| 7,803,736 B2 | 9/2010 | Rohde |
| 7,884,163 B2 | 2/2011 | Mcdaniel |
| 7,981,832 B2 | 7/2011 | Mcdaniel |
| 8,114,353 B2 | 2/2012 | Benham |
| 8,114,946 B2 | 2/2012 | Yang |
| 8,309,485 B2 | 11/2012 | Yang |
| 8,349,264 B2 | 1/2013 | Benham |
| 8,372,771 B2 | 2/2013 | Benham |
| 8,790,579 B2 | 7/2014 | Benham |
| 8,822,608 B1 | 9/2014 | Bhandarkar |
| 9,006,363 B2 | 4/2015 | Moineau |
| 9,376,511 B2 | 6/2016 | Mcdaniel |
| 9,988,468 B2 | 6/2018 | Mcdaniel |
| 10,300,460 B1 | 5/2019 | Mcdaniel |
| 10,323,109 B2 | 6/2019 | Mcdaniel |
| 10,358,514 B2 | 7/2019 | Detournay |
| 10,513,570 B2 | 12/2019 | Mcdaniel |
| 10,543,480 B2 | 1/2020 | Mcdaniel |
| 10,669,362 B2 | 6/2020 | Mcdaniel |
| 10,722,874 B2 | 7/2020 | Mcdaniel |
| 10,821,428 B2 | 11/2020 | Mcdaniel |
| 10,858,456 B1 | 12/2020 | Mcdaniel |
| 10,858,460 B2 | 12/2020 | Mcdaniel et al. |
| 10,889,664 B2 | 1/2021 | Mcdaniel |
| 10,894,249 B2 | 1/2021 | Mcdaniel |
| 10,894,250 B2 | 1/2021 | Mcdaniel |
| 10,988,557 B2 | 4/2021 | Mcdaniel |
| 11,110,443 B2 | 9/2021 | Mcdaniel |
| 11,117,122 B2 | 9/2021 | Mcdaniel |
| 11,149,098 B2 | 10/2021 | Mcdaniel |
| 11,154,850 B2 | 10/2021 | Neygandhi |
| 11,220,564 B2 | 1/2022 | Mcdaniel |
| 11,242,416 B2 | 2/2022 | Mcdaniel |
| 11,242,417 B2 | 2/2022 | Mcdaniel |
| 11,242,418 B2 | 2/2022 | Mcdaniel |
| 11,266,976 B2 | 3/2022 | Mcdaniel |
| 11,267,908 B2 | 3/2022 | Mcdaniel |
| 11,298,683 B2 | 4/2022 | Mcdaniel |
| 11,325,996 B2 | 5/2022 | Mcdaniel |
| 11,358,131 B2 | 6/2022 | Mcdaniel |
| 11,358,132 B2 | 6/2022 | Mcdaniel |
| 11,383,222 B2 | 7/2022 | Mcdaniel |
| 11,384,171 B2 | 7/2022 | Mcdaniel |
| 11,384,179 B2 | 7/2022 | Mcdaniel |
| 11,542,348 B2 | 1/2023 | Mcdaniel |
| 11,583,840 B2 | 2/2023 | Mcdaniel |
| 11,583,841 B2 | 2/2023 | Mcdaniel |
| 11,584,806 B2 | 2/2023 | Romig |
| 2004/0192863 A1* | 9/2004 | Towles ............. C08F 110/02 502/309 |
| 2020/0039226 A1 | 2/2020 | Kakamu et al. |
| 2022/0017681 A1 | 1/2022 | Mcdaniel |
| 2022/0135708 A1 | 5/2022 | Mcdaniel |
| 2022/0152586 A1 | 5/2022 | Mcdaniel |
| 2022/0306463 A1 | 9/2022 | Mcdaniel |
| 2022/0306773 A1 | 9/2022 | Mcdaniel |

FOREIGN PATENT DOCUMENTS

| | | | |
|---|---|---|---|
| EP | 2322564 A1 | 5/2011 | |
| WO | 2004052848 A1 | 6/2004 | |
| WO | 2005082944 A2 | 9/2005 | |
| WO | 2005113146 A1 | 12/2005 | |
| WO | 2009085104 A1 | 7/2009 | |
| WO | WO 2012/072605 A1 * | 6/2012 | ............. B01J 23/26 |
| WO | 2018064050 A2 | 4/2018 | |
| WO | 2019099291 A1 | 5/2019 | |
| WO | 2019099292 A1 | 5/2019 | |
| WO | 2019156725 A2 | 8/2019 | |
| WO | 2019204075 A1 | 10/2019 | |
| WO | 2019204076 A1 | 10/2019 | |
| WO | 2020068638 A1 | 4/2020 | |
| WO | 2020152275 A1 | 7/2020 | |
| WO | 2021154676 A1 | 7/2020 | |
| WO | 2022178496 A1 | 8/2022 | |

OTHER PUBLICATIONS

Brunauer, et al., "Adsorption of Gases in Multimolecular Layers", Journal of the American Chemical vol. 60, pp. 309-319.

Film Extrusion Manual—Process, Materials, Properties, TAPPI Press, 1992, 16 pages.

Hieber, C. A., et al., "Shear-rate-dependence modeling of polymer melt viscosity," Polymer Engineering and Science, Jul. 1992, pp. 931-938, vol. 32, No. 14.

Hieber, C. A., et al., "Some correlations involving the shear viscosity of polystyrene melts," Rheol Acta, 1989, pp. 321-332, vol. 28.

IUPAC Compendium of Chemical Terminology, 2nd Ed. 1997, pp. 1-1670.

Modern Plastics Encyclopedia, Mid-Nov. 1995 Issue, vol. 72, 3 pages.

Monwar, M. M, et al., "Initiation of the Phillips Cr(VI) Catalyst by Alkenes" ACS Catal. 2024, 14, 15052-15072. DOI:10 1021/acscatal. 4c04326.

Welch, et al., "The Activation of the Phillips Polymerization Catalyst; II. Activation by Reduction-Reoxidation", J Catalysis, vol. 82, No. 1, Jul. 1, 1983, pp. 110-117.

Partial International Search Report issued in corresponding PCT Application No. PCT/US2024/054885, Feb. 18, 2025, 17 pp.

Declaration of David W. Dockter, Ph.D., Apr. 23, 2025, 2 pages.

* cited by examiner

SYSTEMS AND METHODS FOR CHROMIUM CATALYST ACTIVATION

REFERENCE TO RELATED APPLICATION

This application claims the benefit of U.S. Provisional Patent Application No. 63/597,370, filed on Nov. 9, 2023, the disclosure of which is incorporated herein by reference in its entirety.

FIELD OF THE INVENTION

The present disclosure generally relates to methods for activating supported chromium pre-catalysts and to the use of the activated chromium catalysts to polymerize olefins.

BACKGROUND OF THE INVENTION

Supported chromium pre-catalysts are activated by exposure to an oxygen-containing atmosphere (e.g., air) at elevated temperatures to convert at least a portion of lower valence chromium to an oxidation state of +6 (hexavalent chromium). However, in commercial practice, activation of large quantities of supported chromium catalysts often results in relatively low conversion to Cr(VI), and the resulting activated chromium catalyst often cannot efficiently produce relatively high melt index polymers with low film gel content. Further, exposure to the oxygen-containing atmosphere can result in a significant exotherm, which needs to be controlled to prevent damage to the catalyst and to the activation vessel. It would be beneficial to overcome these deficiencies with alternative methods of catalyst activation and, accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Aspects of this invention are directed to processes for producing an activated (or calcined) chromium catalyst, and one such process can comprise (1) exposing a pre-catalyst in a fluidized bed vessel to feed cycles of a second oxidizing gas and a second inert gas at a temperature T2 in a range from 250° F. to 700° F. (121° C. to 371° C.) to a temperature T3 in a range from 700° F. to 950° F. (371° C. to 482° C.), and (2) heating the pre-catalyst, while introducing a third inert gas or a third oxidizing gas into the fluidized bed vessel, to a temperature T4 in a range from 1000° F. to 1600° F. (538° C. to 871° C.) and holding the pre-catalyst at T4 in the third inert gas or the third oxidizing gas for a hold time t1 in a range from 1 hr to 15 hr. The duration of each second oxidizing gas feed cycle independently is from 10 sec to 15 min, such as from 20-30 sec, and the duration of each second inert gas feed cycle independently is from 10 sec to 15 min, such as from 4-5 min. The average duration of the second oxidizing gas feed cycles is less than an average duration of the second inert gas feed cycles, and an average temperature rate increase in step (1) is from 0.5 to 10° F./min (0.3 to 6° C./min), such as 2 to 4° F./min (1 to 2° C./min).

Another process for producing an activated (or calcined) chromium catalyst described herein can comprises (1) exposing a pre-catalyst in a fluidized bed vessel to a feed of a first dilute oxidizing gas at a temperature T2 in a range from 250° F. to 700° F. (121° C. to 371° C.) and up to and including a temperature T3 in a range from 700° F. to 950° F. (371° C. to 510° C.), and (2) heating the pre-catalyst, while introducing a third inert gas or a third oxidizing gas into the fluidized bed vessel, to a temperature T4 in a range from 1000° F. to 1600° F. (538° C. to 871° C.) and holding the pre-catalyst at T4 in the third inert gas or the third oxidizing gas for a hold time t1 in a range from 1 hr to 15 hr. The first dilute oxidizing gas can contain from 1 to 10 vol % oxygen, such as 3 to 6 vol % oxygen.

Olefin polymerization processes also are provided herein. These polymerization processes can comprise (I) performing any process to produce the activated chromium catalyst disclosed herein, and (II) contacting the activated chromium catalyst and an optional co-catalyst with an olefin monomer and an optional olefin comonomer in a polymerization reactor system under polymerization conditions to produce an olefin polymer.

Other aspects of this invention are directed to activation systems, and such systems can comprise (a) a fluidized bed vessel having one or more heating zones and configured to fluidize and activate a supported chromium pre-catalyst, (b) one or more fluidizing gas inlets configured to introduce a fluidizing gas into the fluidized bed vessel, the fluidizing gas comprising (i) an inert gas, (ii) an oxygen-containing gas, or (iii) a mixture of the inert gas and the oxygen-containing gas, (c) one or more thermocouples positioned inside the fluidized bed vessel for measuring an activation temperature inside the fluidized bed vessel, and (d) a controller configured to cycle the fluidizing gas between (i) the inert gas and (ii) the oxygen-containing gas or to adjust (iii) the mixture of the inert gas and the oxygen-containing gas, based on time intervals and/or based on the activation temperature measured by the one or more thermocouples.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

Figure 1:
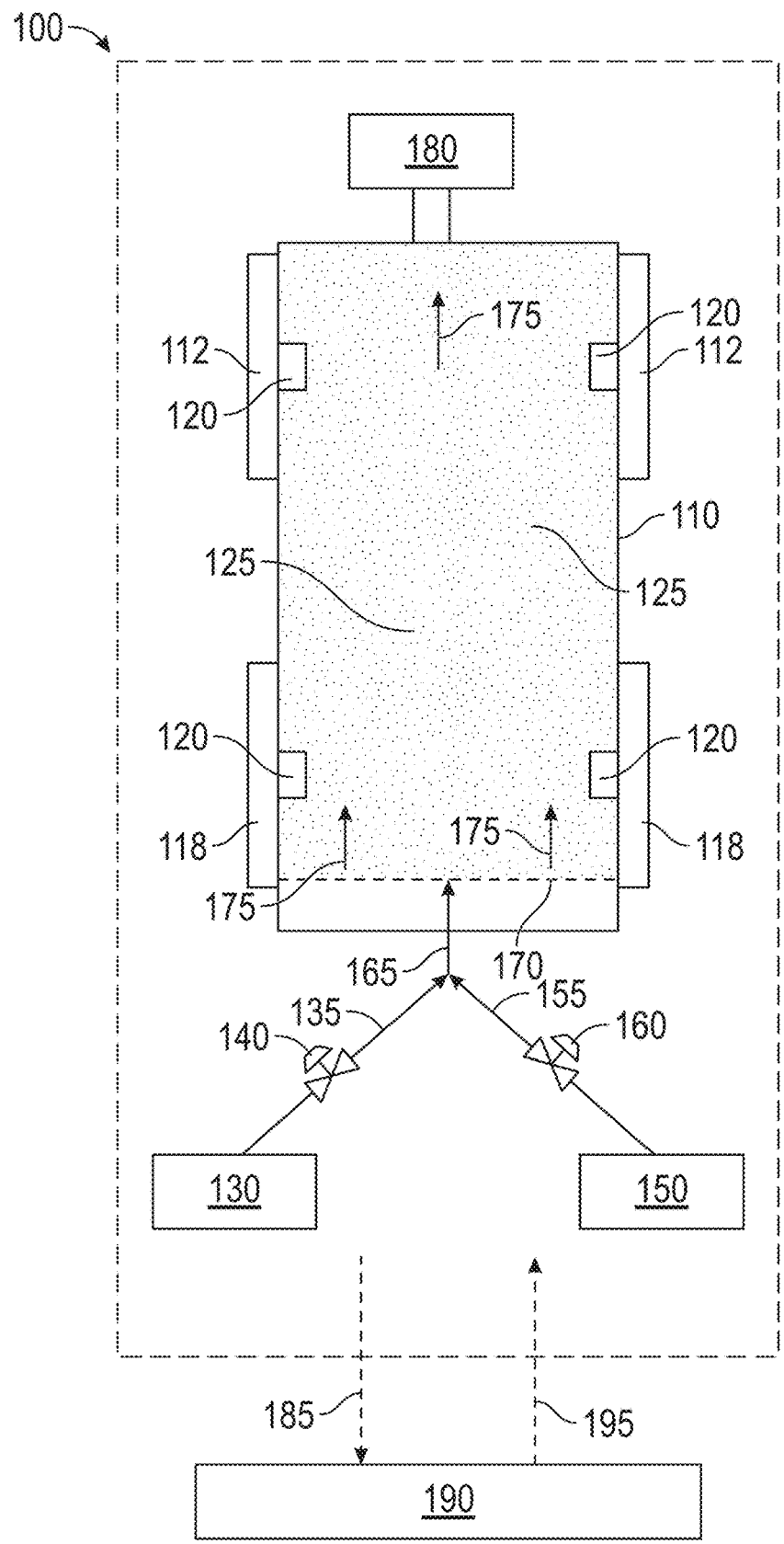
FIG. 1 illustrates a catalyst activation system consistent with an aspect of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the catalysts, compositions, processes, or methods described herein are contemplated with or without explicit description of the particular combination. Additionally, unless explicitly recited otherwise, any aspect or feature disclosed herein can be combined to describe inventive catalysts, compositions, processes, or methods consistent with the present disclosure.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" whenever used in this specification and claims refers to a compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). Non-limiting examples of hydrocarbons include alkanes (linear, branched, and cyclic), alkenes (olefins), and aromatics, among other compounds.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

The terms "contacting" and "exposing" and the like are used herein to describe catalysts, compositions, processes, and methods in which the materials or components are combined together in any order, in any manner, and for any length of time, unless otherwise specified. For example, the materials or components can be blended, mixed, slurried, dissolved, reacted, treated, impregnated, compounded, fluidized, or otherwise combined in some other manner or by any suitable method or technique.

"BET surface area" as used herein means the surface area as determined by the nitrogen adsorption Brunauer, Emmett, and Teller (BET) method according to ASTM D1993-91, and as described, for example, in Brunauer, S., Emmett, P. H., and Teller, E., "Adsorption of gases in multimolecular layers," *J. Am. Chem. Soc.*, 60, 3, pp. 309-319.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer are ethylene and 1-hexene, respectively, the resulting polymer can be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers.

In this disclosure, while catalysts, compositions, processes, and methods are described in terms of "comprising" various components or steps, the catalysts, compositions, processes, and methods also can "consist essentially of" or "consist of" the various components or steps, unless stated otherwise. The terms "a," "an," and "the" are intended to include plural alternatives, e.g., at least one, unless otherwise specified.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, the oxidizing gas can have a range of oxygen contents in aspects of this invention. By a disclosure that the oxidizing gas can contain from 1 to 40 vol % oxygen, the intent is to recite that the oxygen content can be any amount in the range and, for example, can include any range or combination of ranges from 1 to 40 vol %, such as from 1 to 30 vol %, from 2 to 21 vol %, from 3 to 25 vol %, or from 4 to 10 vol % oxygen, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

Although any methods, devices, and materials similar or equivalent to those described herein can be used in the practice or testing of the invention, the typical methods, devices, and materials are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION OF THE INVENTION

The present invention is generally directed to the conversion of lower valence supported chromium pre-catalysts to activated (hexavalent) chromium catalysts, which are subsequently used in olefin polymerization processes.

An objective of the invention is to produce activated chromium catalysts with high Cr(VI) content and catalytic activity. Another objective is to produce activated chromium catalysts with high melt index potential, such that ethylene-based polymers can be produced with lower molecular weights and/or higher melt flow rates. Another objective is to produce activated catalysts with high melt index potential at relative low calcination/activation temperatures. Another objective is to produce activated chromium catalysts that can produce ethylene-based polymers with a broad molecular weight distributions and low levels of long chain branching. Another objective is to produce activated chromium catalysts that can produce ethylene-based polymers with surprisingly low film gel levels. Another objective is to produce activated chromium catalysts that can produce ethylene-based polymers that have improved extrusion processability for a multitude of applications, including blown film, pipe, and blow molded products. Another objective is to produce activated chromium catalysts without the occurrence of a significant exotherm during the activation process and with reduced emissions during the activation process. These and other benefits are described hereinbelow.

Processes for Activating Chromium Catalysts

Processes for producing an activated (or calcined) chromium catalyst are disclosed herein. A first process can comprise (1) exposing a pre-catalyst in a fluidized bed vessel to feed cycles of a second oxidizing gas and a second inert gas at a temperature T2 in a range from 250° F. to 700° F. (121° C. to 371° C.) to a temperature T3 in a range from 700° F. to 950° F. (371° C. to 510° C.), and (2) heating the pre-catalyst, while introducing a third inert gas or a third oxidizing gas into the fluidized bed vessel, to a temperature T4 in a range from 1000° F. to 1600° F. (538° C. to 871° C.) and holding the pre-catalyst at T4 in the third inert gas or the third oxidizing gas for a hold time t1 in a range from 1 hr to 15 hr. The duration of each second oxidizing gas feed cycle independently is from 10/sec to 15 min (e.g., from 10 sec to 5 min, from 10 sec to 1 min, from 1 min to 10 min, from 1 min to 5 min, from 20 sec to 10 min, from 20 sec to 2 min, or from 20 sec to 1 min, and so forth), and the duration of each second inert gas feed cycle independently is from 10 sec to 15 min (e.g., from 10 sec to 5 min, from 10 sec to 1 min, from 1 min to 10 min, from 1 min to 5 min, from 20 sec to 10 min, or from 20 sec to 2 min, and so forth). The average duration of the second oxidizing gas feed cycles is less than an average duration of the second inert gas feed cycles, and the average temperature rate increase in step (1) is from 0.5 to 10° F./min (0.3 to 6° C./min). While not wishing to be bound by theory, it is believed that this first process can lower emissions during the activation/calcination process while concurrently minimizing or preventing exotherms.

The second oxidizing gas in each cycle of step (1) can be the same or different and can independently comprise (or consist essentially of, or consist of) oxygen, air, a mixture of oxygen and an inert gas (e.g., nitrogen), a mixture of air and an inert gas (e.g., nitrogen), and the like, as well as any combination thereof. The second oxidizing gas in each cycle of step (1) can contain—independently—any suitable vol % of oxygen ranging from 1 to 40 vol %. In one aspect, the vol % of oxygen can be from 1 to 30 vol %, while in another aspect, the vol % of oxygen can be from 2 to 21 vol %, and in yet another aspect, the vol % of oxygen can be from 3 to 25 vol %, and in still another aspect, the vol % of oxygen can be from 4 to 10 vol %.

Similar to the second oxidizing gas in each cycle of step (1), the second inert gas in each cycle of step (1) can be the same or different. Independently, the second inert gas in each cycle of step (1) can comprise (or consist essentially of, or consist of) nitrogen, argon, or a combination thereof; alternatively, nitrogen; or alternatively, argon.

Any suitable number of cycles of the oxidizing gas and the inert gas are utilized, for instance, to control the exotherm that results upon exposure of the pre-catalyst to oxygen. While not limited thereto, the number of cycles in step (1) usually is from 5 to 50, but more often, the number of cycles in step (1) is from 5 to 40, from 5 to 30, from 6 to 50, from 6 to 40, from 6 to 25, from 7 to 40, from 7 to 25, from 10 to 50, from 10 to 25, or from 10 to 20 cycles.

The average temperature rate increase in step (1) is from 0.5 to 10° F./min (0.3 to 6° C./min), but is not limited thereto. Other suitable ranges for the average temperature rate increase in step (1) include, for instance, from 1 to 5° F./min (0.6 to 3° C./min), from 1.5 to 4° F./min (0.8 to 2.2° C./min), or from 2 to 3.5° F./min (1 to 2° C./min), and the like. The temperature rate increase can be controlled or adjusted by varying the relative durations of the oxidizing feed cycles and inert feed cycles.

A second process for producing an activated (or calcined) chromium catalyst can comprise (1) exposing a pre-catalyst in a fluidized bed vessel to a feed of a first dilute oxidizing gas at a temperature T2 in a range from 250° F. to 700° F. (121° C. to 371° C.) and up to and including a temperature T3 in a range from 700° F. to 950° F. (371° C. to 510° C.), and (2) heating the pre-catalyst, while introducing a third inert gas or a third oxidizing gas into the fluidized bed vessel, to a temperature T4 in a range from 1000° F. to 1600° F. (538° C. to 871° C.) and holding the pre-catalyst at T4 in the third inert gas or the third oxidizing gas for a hold time t1 in a range from 1 hr to 15 hr. The first dilute oxidizing gas can comprise from 1 to 10 vol % oxygen. While not wishing to be bound by theory, it is believed that this second process also can lower emissions during the activation/calcination process while concurrently minimizing or preventing exotherms.

Similar to the first process, any suitable temperature rate increase can be utilized in step (1) of the second process, such as from 0.5 to 10° F./min (0.3 to 6° C./min). Other non-limiting ranges include from 1 to 5° F./min (0.6 to 3° C./min), from 1.5 to 4° F./min (0.8 to 2.2° C./min), or from 2 to 3.5° F./min (1 to 2° C./min), and the like. The temperature rate increase can be controlled or adjusted by varying the vol % of oxygen present in the first dilute oxidizing gas.

Ordinarily, the first dilute oxidizing gas in step (1) can contain any suitable vol % of oxygen ranging from 1 to 10 vol %. In one aspect, the vol % of oxygen can be from 1 to 9 vol %, while in another aspect, the vol % of oxygen can be from 1 to 8 vol %, and in another aspect, the vol % of oxygen can be from 2 to 8 vol %, and in yet another aspect, the vol % of oxygen can be from 2 to 7 vol %, and in still another aspect, the vol % of oxygen can be from 3 to 6 vol %. In the second process, therefore, the pre-catalyst is exposed to the first dilute oxidizing gas; there is no contacting with an inert gas only stream during exotherm elimination and there is no cycling between inert gas and oxidizing gas streams.

Generally, the features of the first process and the second process are independently described herein and these features can be combined in any combination to further describe the disclosed processes to produce an activated chromium catalyst. Moreover, additional process steps can be performed before, during, and/or after any of the steps in any of the processes disclosed herein, and can be utilized without limitation and in any combination to further describe these processes, unless stated otherwise. Further, any activated chromium catalysts produced in accordance with the disclosed processes are within the scope of this disclosure and are encompassed herein. Activated chromium catalysts also may be referred to herein as calcined chromium catalysts.

Prior to step (1) of the first process and the second process, the pre-catalyst can be loaded into a suitable fluidized bed vessel and then heated to T1 in a first inert gas. Thus, the processes disclosed herein can further comprise, prior to step (1), a step of loading and heating the pre-catalyst in the first inert gas to T1. Before loading, the pre-catalyst can be at any suitable temperature, but generally is at ambient temperature to 120° F. (49° C.), although not limited thereto. Generally, the temperature T1 is in range from 400° F. to 700° F. (204° C. to 371° C.), such as from 450° F. to 650° F. (232° C. to 343° C.), or from 500° F. to 600° F. (260° C. to 315° C.).

Loading the pre-catalyst in advance of step (1) can be accomplished by loading from 1 to 10 portions, from 2 to 8 portions, from 3 to 10 portions, or from 3 to 6 portions, of the total pre-catalyst amount into the vessel before step (1) is performed. The number of portions can depend upon the size of the fluidized bed vessel and the amount of the catalyst to be activated, among other considerations. During the loading of each portion of the total pre-catalyst amount, the temperature is generally maintained in a range of from 300 to 600° F. (149° C. to 315° C.), such as from 400 to 600° F. (204° C. to 315° C.). Loading of each portion of the total pre-catalyst amount is often stopped when the temperature drops below 400° F. (204° C.), or below 300° F. (149° C.), typically the result of water evaporation. Additionally or alternatively, loading of each portion of the total pre-catalyst amount can be stopped when the pressure rises above 1 psig, again largely the result of water evaporation.

While not limited thereto, the total charge or total amount of the pre-catalyst can be at least 100 lb, at least 200 lb, at least 300 lb, at least 500 lb, at least 750 lb, at least 1000 lb, at least 1200 lb, or at least 1500 lb, and often up to and including 1750 lb, 2000 lb, or 2500 lb.

Also prior to step (1) of the first process and the second process, there can be a step of determining if an exothermic increase in temperature is occurring in the fluidized bed vessel, and then performing step (1). One measurement or indicator of an exothermic increase in temperature is an increase of at least 30° F. (17° C.) in temperature in the fluidized bed reactor within a time period of 5 min. Another measurement or indicator of an exothermic increase in temperature is when the second derivative of temperature (in the fluidized bed vessel) versus time is positive.

In step (1) of the first and second processes, the temperature T2 ranges from 250° F. to 700° F. (121° C. to 371° C.) and the temperature T3 ranges from 700° F. to 950° F. (371° C. to 510° C.). In one aspect, T2 can fall within a range from 400° F. to 600° F. (204° C. to 315° C.), and in another aspect, T2 can range from 600° F. to 700° F. (315° C. to 371° C.), and in another aspect, T2 can range from 500° F. to 650° F. (260° C. to 343° C.), and in yet another aspect, T2 can range from 625° F. to 700° F. (329° C. to 371° C.), and in still another aspect, T2 can range from 575° F. to 675° F. (302° C. to 357° C.). These and other temperature ranges disclosed herein are meant to encompass circumstances where the respective step in the process is performed at a series of different temperatures, instead of at a single fixed temperature, falling within the respective temperature ranges. Likewise, in one aspect, T3 can fall within a range from 700° F. to 850° F. (371° C. to 454° C.), and in another aspect, T3 can range from 700° F. to 800° F. (371° C. to 427° C.), and in another aspect, T3 can range from 725° F. to 900° F. (385° C. to 482° C.), and in yet another aspect, T3 can range from 750° F. to 950° F. (399° C. to 510° C.), and in still another aspect, T3 can range from 750° F. to 850° F. (399° C. to 454° C.).

Referring now to step (2) of the first and second processes, the pre-catalyst is heated while introducing a third inert gas or a third oxidizing gas into the fluidized bed vessel, to a temperature T4 in a range from 1000° F. to 1600° F. (538° C. to 871° C.) and holding the pre-catalyst at T4 in the third inert gas or the third oxidizing gas for a hold time t1 in a range from 1 hr to 15 hr. Other representative and non-limiting ranges for t1 include from 1 hr to 8 hr, from 2 hr to 10 hr, from 3 hr to 15 hr, from 3 hr to 8 hr, or from 4 hr to 6 hr, and the like. While not being bound by theory, it is believed that the high temperature exposure to an inert atmosphere can dehydroxylate the catalyst, but without premature oxidation of the chromium. Further, it is believed that by using a relatively low T4 temperature, key polymer attributes like molecular weight distribution and low long chain branching can be retained.

The temperature T4 can be in any suitable range from 1000° F. to 1600° F. (538° C. to 871° C.). Representative and non-limiting range from T4 include from 1000° F. to 1300° F. (538° C. to 704° C.), from 1100° F. to 1600° F. (593° C. to 871° C.), from 1100° F. to 1400° F. (593° C. to 760° C.), from 1100° F. to 1300° F. (593° C. to 704° C.), or from 1200° F. to 1300° F. (649° C. to 704° C.), and the like. Any suitable heating rate can be utilized in step (2) to reach T4, and typical heating rates include from 1 to 5° F./min (0.6 to 3° C./min), from 1.5 to 4° F./min (0.8 to 2.2° C./min), or from 2 to 3.5° F./min (1 to 2° C./min), and the like.

The first process and the second process can further comprise a step of (3) cooling the pre-catalyst, while introducing a fourth inert gas into the fluidized bed vessel, to a temperature T5 in a range from 900° F. to 1200° F. (482° C. to 649° C.), with the proviso that the T5 temperature is less than the T4 temperature. Any suitable cooling rate can be utilized in step (3), such as from 1 to 4° F./min (0.6 to 2.2°

C./min), from 1.5 to 3.5° F./min (0.8 to 2° C./min), or from 2 to 3° F./min (1 to 1.7° C./min), and the like. In addition to the range of T5 from 900° F. to 1200° F. (482° C. to 649° C.), other temperature ranges can be utilized, such as the following non-limiting ranges: from 900° F. to 1100° F. (482° C. to 593° C.), from 950° F. to 1150° F. (510° C. to 621° C.), from 1000° F. to 1200° F. (538° C. to 649° C.), or from 1000° F. to 1100° F. (538° C. to 593° C.), and so forth.

After reaching the temperature T5 while introducing the fourth inert gas into the fluidized bed vessel, the gas composition is optionally changed, and in a step (4), the pre-catalyst can be exposed to a fourth oxidizing gas in the fluidized bed vessel at T5 for a hold time t2 in a range from 30 min to 10 hr. Generally, the hold time t2 is a period of time sufficient to form at least 30 wt. %, and more often, at least 50 wt. %, at least 70 wt. %, or at least 80 wt. % chromium (VI), based on the amount of chromium present on the activated chromium catalyst. In step (4), the hold time t2 can range from 30 min to 10 hr, but other representative and non-limiting ranges for t2 include from 30 min to 8 hr, from 1 hr to 10 hr, from 1 hr to 8 hr, from 2 hr to 6 hr, or from 3 hr to 5 hr, and the like. There is often a balance between chromium conversion and melt index potential, since longer t2 hold times and higher temperatures can decrease melt index potential.

The first process and the second process can further comprise a step of (5) cooling, while introducing a fifth oxidizing gas into the fluidized bed vessel, to a temperature T6 in a range from 500° F. to 700° F. (260° C. to 371° C.) to produce the activated (calcined) chromium catalyst. Any suitable cooling rate can be utilized in step (5), such as from 1 to 4° F./min (0.6 to 2.2° C./min), from 1.5 to 3.5° F./min (0.8 to 2° C./min), or from 2 to 3° F./min (1 to 1.7° C./min), and the like. In addition to the range of T6 from 500° F. to 700° F. (260° C. to 371° C.), other temperature ranges can be utilized, such as the following non-limiting ranges: from 500° F. to 650° F. (260° C. to 343° C.), from 550° F. to 700° F. (288° C. to 371° C.), from 550° F. to 650° F. (288° C. to 343° C.), or from 600° F. to 675° F. (315° C. to 357° C.), and so forth. While not required, often the temperature T6 is within 150° F. (83° C.), within 100° F. (56° C.), within 50° F. (28° C.), within 25° F. (14° C.), or within 10° F. (6° C.) of the temperature T1. While not being bound by theory, it is believed that changing to an inert atmosphere at a relatively high temperature can damage the conversion to Cr(VI).

After step (5), the activated (calcined) chromium catalyst can be subjected to a step of (6) purging the activated (calcined) chromium catalyst in a fifth inert gas in the fluidized bed vessel at T6 and cooling to ambient temperature (which is nominally 77° F. or 25° C.). While not limited thereto, in step (6), the activated (calcined) chromium catalyst can be purged with the fifth inert gas at T6 for a purge time t3 that typically falls within a range from 2 min to 20 hr; alternatively, from 5 min to 12 hr; alternatively, from 5 min to 5 hr; alternatively, from 15 min to 4 hr; or alternatively, from 30 min to 6 hr. While not being bound by theory, it is believed that purging with the inert gas is important to remove oxygen/air from the catalyst pores, so as to prevent the oxygen/air from acting as a poison when in the reactor during polymerization.

In the first and second processes for producing the activated chromium catalyst, the first inert gas, the third inert gas, the fourth inert gas, and the fifth inert gas can be the same or different. For instance, in one aspect, the third inert gas and the fourth inert gas are the same, while in another aspect, the third inert gas and the fourth inert gas are different. The first inert gas, the third inert gas, the fourth inert gas, and the fifth inert gas—independently—can comprise (or consist essentially of, or consist of) nitrogen, argon, or a combination thereof; alternatively, nitrogen; or alternatively, argon.

Similarly, the first oxidizing gas, the third oxidizing gas, the fourth oxidizing gas, and the fifth oxidizing gas can be the same or different. For instance, in one aspect, the third oxidizing gas and the fourth oxidizing gas are the same, while in another aspect, the third oxidizing gas and the fourth oxidizing gas are different. The first oxidizing gas, the third oxidizing gas, the fourth oxidizing gas, and the fifth oxidizing gas—independently—can comprise (or consist essentially of, or consist of) oxygen, air, a mixture of oxygen and an inert gas (e.g., nitrogen), a mixture of air and an inert gas (e.g., nitrogen), and the like, as well as any combination thereof. The first oxidizing gas, the third oxidizing gas, the fourth oxidizing gas, and the fifth oxidizing gas can contain—independently—any suitable vol % of oxygen ranging from 1 to 40 vol %. In one aspect, the vol % of oxygen can be from 1 to 30 vol %, while in another aspect, the vol % of oxygen can be from 2 to 21 vol %, and in yet another aspect, the vol % of oxygen can be from 3 to 25 vol %, and in still another aspect, the vol % of oxygen can be from 4 to 10 vol %.

Herein, the fluidized bed vessel can be operated batchwise or continuously, or any one or more steps in the processes can conducted batchwise or continuously. Catalyst amounts and bed depths can be any that are suitable for fluidized bed operation. In the first and second processes for producing activated chromium catalysts, the pre-catalyst (or the activated catalyst) can be contacted with gas streams in the fluidized bed vessel at any suitable linear velocity, generally in the range of from 0.05 to 0.6 ft/sec. For instance, each step in the disclosed processes can be performed by fluidizing the pre-catalyst (or the activated catalyst, as the context requires) in an inert fluidizing gas (for an inert atmosphere) or an oxygen-containing fluidizing gas (for an oxidizing atmosphere) at a linear velocity of the gas stream—independently—within a range of from 0.05 to 0.6 ft/sec, and in some aspects, from 0.05 to 0.3 ft/sec or from 0.1 to 0.4 ft/sec, and in other aspects, from 0.2 to 0.5 ft/sec, from 0.2 to 0.4 ft/sec, or from 0.2 to 0.3 ft/sec.

While not limited thereto, the diameter of the fluidized bed vessel can be at least 12 in, at least 20 in, at least 30 in, at least 40 in, or at least 50 in, and often up to and including 55 in, 60 in, or 70 in.

The activated catalyst produced from the disclosed activation processes has many properties that are superior to that of otherwise identical catalysts that were not subjected to the specific steps described hereinabove. For instance, the activated catalyst consistent with this invention can have a melt index potential greater (e.g., at least 10% greater, at least 25% greater, at least 50% greater, at least 75% greater, or at least 100% greater) than that of an otherwise identical catalyst (often referred to as a control catalyst) activated by exposure to an oxidizing gas at a temperature T4 for a hold time of t1. Alternatively, the control catalyst can be Magnapore® catalyst, which is commercially available from W. R. Grace, when calcined at a temperature of 1200° F. (649° C.) for a time period of 3 hr (for lab scale) or 8 hr (for large scale). When making these comparisons, it is necessary that the polymerization reaction be conducted under the same conditions. That is, the reaction temperature should be identical, and the concentration of ethylene and comonomer in the reaction zone should also be the same, and the productivity reached should be the same, preferably in the range of 3000 gPE/gCat to 5000 gPE/gCat.

This improved melt index potential can be measured via melt index (MI, $I_2$), or high load melt index (HLMI, $I_{21}$), or both. As an example, the activated catalyst of the present invention can have a MI potential of at least 0.2, at least 0.3, at least 0.4, at least 0.5, at least 0.6, at least 0.7, at least 0.8, at least 0.9, at least 1, or at least 1.2 g/10 min. Additionally or alternatively, the activated catalyst of the present invention, when tested in isobutane at 105° C., 550 psig ethylene to 3000 gPE/gCat, can have a HLMI potential of at least 20, at least 25, at least 30, at least 35, at least 40 at least 50, at least 60, at least 70, at least 80, or at least 100 g/10 min.

While the herein described activated catalysts can offer significant improvements in melt index potential, the polymer produced often can be very similar to that produced with a control catalyst. In some aspects, therefore, the activated catalyst consistent with this invention can produce a polymer under standard polymerization conditions having a ratio of Mw/Mn (or a ratio of Mz/Mw, or a CY-a parameter) that is within 35% (or within 30%, within 25%, or within 20%, or within 15%, or within 10%, or within 5%) of the Mw/Mn (or the Mz/Mw, or the CY-a parameter) of a polymer produced using a control catalyst as defined above. Standard polymerization conditions are detailed in the examples below, but briefly, isobutane diluent, 105° C. polymerization temperature, 550 psig ethylene pressure, for a time needed to reach a productivity of 3000 g polymer per g of catalyst.

Additionally or alternatively, the activated catalyst consistent with this invention can produce a polymer under standard polymerization conditions having a Mw that is 30% less than (or 25% less than, or 20% less than, or 15% less than, or 10% less than) the Mw of a polymer produced using a control catalyst as defined above, when compared at the same or substantially the same MI (or HLMI), as the context requires.

Unexpectedly, the activated catalyst consistent with this invention can produce polymers with lower amounts of gels. In one aspect, wherein the activated catalyst can produce a polymer under standard polymerization conditions that has a total film gel count (or a catalyst particle gel count) of less than or equal to 100 gels per ft$^2$ of 25 micron thick film (and in some instances, less than or equal to 80, or less than or equal to 60, or less than or equal to 40, or less than or equal to 30, or less than or equal to 20, or less than or equal to 10, or less than or equal to 5, gels per ft$^2$ of 25 micron thick film), wherein film gels encompass a size greater than 200 µm (and caused by catalyst particles for the catalyst particle gel count).

Generally, the disclosed processes are applicable to the activation of any supported chromium pre-catalyst that comprises a silica support, thereby forming the activated chromium catalyst with at least a portion of the chromium in a hexavalent oxidation state. Thus, supported chromium pre-catalysts contemplated herein encompass those prepared by contacting a silica support with a chromium-containing compound (a chromium precursor, a source of chromium) and an optional titanium-containing compound (a titanium precursor, a source of titanium). The pre-catalyst often can be referred to as a chromium/silica pre-catalyst, or a titanated chromium/silica pre-catalyst if titanium is utilized. The pre-catalyst can be formed by depositing a water-soluble chromium compound (and a water-soluble titanium compound, if used) onto a pre-formed silica in an aqueous slurry, then spray drying the slurry to form the pre-catalyst. The pre-catalyst also can be formed by depositing a water-soluble titanium compound onto a pre-formed silica already containing the necessary chromium in an aqueous slurry, then spray drying the slurry to form the pre-catalyst.

While not limited thereto, when used, typical titanium compounds include titanium carboxylates, which can also contain a nitrogen compound to help adjust the pH. Carboxylates can be di-carboxylic or tricarboxylic acids and alpha-hydroxy mono-carboxylic acids, examples of which include oxalic acid, citric acid, malic acid, lactic acid, glycolic acid, gluconic acid, 2-hydroxybutyric acid, glyoxylic acid, malonic acid, phosphonoacetic acid, tartaric acid, and the like. Suitable nitrogen compounds include simple alkyl amines, alkanol amines, cyclic amines, and more complex multi-nitrogen compounds, as well as amides and quaternary ammonium hydroxides. Examples include dimethyl formamide (DMF), acetamide, acryl amide, allyl amine, ammonia, methyl amine, diethyl amine, ethanol amine, diethanol amine, butyl amine, tert-butyl amine, N,N'-dibutyl urea, tetraethyl ammonium hydroxide, ammonium hydroxide, dimethyl ethanol amine, creatine, creatinine, 1,8-diazabicyclo[5.4.0]undec-7-ene (DBU), diethylhydroxy amine, diisopropanol amine, dimethylaminoethanol, dimethyl carbamate, dimethyl formamide, dimethyl glycine, dimethylisopropanol amine, N,N'-dimethyl urea, ethyl amine, glycol amine, hexyl amine, hydroxyamine, imidazole, isopropanol amine, methacryl amide, N-methyl aniline, N-methyl-2-propanol amine, methyldiethanol amine, methyl formamide, propyl amine, 2-propanol amine, pyrazole, pyrrolidine, pyrrolidinone, succinimide, tetraethylammonium hydroxide, tetramethylammonium hydroxide, triethanol amine, triisopropanol amine, trimethyl amine, urea, and the like. Typical chromium compounds include chromium (III) acetate, basic chromium (III) acetate, chromium (III) formate, $Cr_2O_3$, $Cr(OH)_3$, $Cr(NO_3)_3$, and the like. Generally, the chromium compound is a trivalent compound, though hexavalent chromium compounds are also suitable, but only if they are then reduced to the trivalent form during catalyst manufacture. The silica used in this invention can be any suitable pre-formed silica xerogel that has an acceptable porosity, with grades available from Asahi Glass and Grace (e.g., HA30W). While not limited thereto, silicas having BET surface areas of from 300 to 500 m$^2$/g, pore volumes of from 1.5 to 2.0 m$^2$/g (e.g., approximately 1.6 mL/g), and d50 average particle sizes of from 30 to 130 microns (e.g., 40 to 70 microns) are conveniently used. Additional information on pre-catalysts that can be activated as described herein, and methods of preparing the pre-catalysts, is provided in representative U.S. Pat. Nos. 10,300,460, 10,323, 109, 10,513,570, 10,543,480, 10,722,874, 10,858,456, 10,889,664, and 11,242,416.

Chromium polymerization catalysts generally require supports of relatively high porosity so as to allow fragmentation of the catalyst and subsequent egress of the polymer chains from the fragments, a portion of these chains being hundreds of times longer than the pore diameter in the catalyst. Thus, the total pore volume of the pre-catalyst (or the silica support, or the activated chromium catalyst) often falls within a range from 0.5 to 5 mL/g, and more often, from 1 to 5 mL/g, from 1 to 3 mL/g, or from 1.5 to 2 mL/g, and the like. The BET surface area of the pre-catalyst (or the silica support, or the activated chromium catalyst) is not limited to any particular range, but generally is in a range from 100 to 700 m$^2$/g, such as from 200 to 600 m$^2$/g, from 250 to 550 m$^2$/g, or from 300 to 500 m$^2$/g, and the like.

The pre-catalyst, the silica support, and the activated chromium catalyst can have any suitable shape or form, and such can depend on the type of polymerization process in which the chromium catalyst is utilized. Generally, however, the pre-catalyst, the silica support, and the activated chromium catalyst have a relatively small particle size, in which representative ranges for the average (d50) particle size of the pre-catalyst (or the silica support, or the activated chromium catalyst) can include from 10 to 500 microns, from 15 to 250 microns, from 30 to 130 microns, or from 40 to 70 microns, although not limited thereto.

Referring to both the first process and the second process, the pre-catalyst (or the activated catalyst) comprises a silica support and from 0.1 to 5 wt. % chromium. Other suitable ranges for the amount of chromium present on the pre-catalyst (or the activated chromium catalyst) include, but are not limited to, from 0.1 to 4 wt. %, from 0.2 to 5 wt. %, from 0.5 to 3 wt. %, from 0.5 to 2 wt. %, or from 0.5 to 1.5 wt. % of chromium. These weight percentages are based on the amount of chromium relative to the total weight of the pre-catalyst or the activated chromium catalyst.

The amount of chromium in an oxidation state of +5 or less in the pre-catalyst (prior to activation) is not particularly limited. The amount of the chromium of the pre-catalyst in an oxidation state of +5 or less typically is at least 50 wt. %, and more often, at least 60 wt. %, at least 70 wt. %, at least 80 wt. %, at least 90 wt. %, or at least 95 wt. %. This percentage is based on the amount of the chromium of the pre-catalyst in an oxidation state of +5 or less relative to the total amount of chromium on the pre-catalyst.

Conversely, at least 40 wt. % of the chromium in the activated chromium catalyst is present in a hexavalent oxidation state after the activation step, and more often at least 50 wt. % is present as chromium (VI). In further aspects, at least 60 wt. %, at least 70 wt. %, at least 80 wt. %, at least 90 wt. %, or at least 95 wt. %, of the chromium in the activated chromium catalyst can be present in an oxidation state of +6. These weight percentages are based on the total amount of chromium present on the activated chromium catalyst. Traditional chromium (VI) catalysts often will have an orange, yellow, or tan color, indicating the presence of chromium (VI).

Referring to both the first process and the second process, the pre-catalyst (or the activated chromium catalyst) can comprise a silica support, from 0.1 to 5 wt. % chromium, and from 0.1 to 10 wt. % titanium (when present). Other suitable ranges from the amount of titanium present on the pre-catalyst (or the activated chromium catalyst) include, but are not limited to, from 0.5 to 10 wt. %, from 1 to 10 wt. %, from 2 to 8 wt. %, or from 2 to 6 wt. % of titanium. These weight percentages also are based on the amount of titanium relative to the total weight of the pre-catalyst or the activated catalyst.

The pre-catalyst (or the activated chromium catalyst) also can contain nitrogen from the nitrogen-containing compounds that were used to prepare the pre-catalyst. Generally, the pre-catalyst (or the activated chromium catalyst) contains from 1 to 5 mol nitrogen per mole of titanium, and more often, from 1 to 4.5, from 1.5 to 5, from 1.5 to 4.5, from 2 to 5, from 2 to 4, or from 2 to 3 mol nitrogen/mol titanium.

The pre-catalyst also can be characterized by carboxylate groups/ligands that are present before activation, as well as the amount of carbon. In one aspect, the pre-catalyst can contain from 1 to 5 mol carboxylate per mole of titanium, from 1 to 4 mol carboxylate/mol titanium in another aspect, from 1 to 3 mol carboxylate/mol titanium in another aspect, from 1.5 to 5 mol carboxylate/mol titanium in another aspect, from 1.5 to 4 mol carboxylate/mol titanium in yet another aspect, and from 2 to 3 mol carboxylate/mol titanium in still another aspect. Examples of carboxylates (inclusive of dicarboxylates) include acetate, oxalate, citrate, malate, lactate, gluconate, glycolate, 2-hydroxy butyrate, glyoxylate, lactate, malate, malonate, phosphonoacetate, tartrate, and the like.

Additionally or alternatively, the pre-catalyst can contain from 0.5 to 10 wt. % carbon prior to activation, and more often, from 1 to 10 wt. %, from 1 to 5 wt. %, from 2 to 10 wt. %, from 2 to 8 wt. %, or from 2 to 6 wt. % carbon, and the like. These weight percentages are based on the amount of carbon relative to the weight of the pre-catalyst.

The pre-catalyst in the first process and the second process can be subjected to the activation process alone, or optionally in a blend or mixture with a second pre-catalyst having a different catalyst composition. Any relative amounts of the pre-catalyst in step (1) and the second pre-catalyst can be utilized. For instance, the second pre-catalyst can be a chromium/silica pre-catalyst; alternatively, a chromium/silica-titania cogel pre-catalyst; or alternatively, a chromia-silica-titania tergel pre-catalyst.

Activation Systems

A catalyst activation system consistent with this disclosure can comprise (a) a fluidized bed vessel having one or more heating zones and configured to fluidize and activate a supported chromium pre-catalyst, (b) one or more fluidizing gas inlets configured to introduce a fluidizing gas into the fluidized bed vessel, the fluidizing gas comprising (i) an inert gas, (ii) an oxygen-containing gas, or (iii) a mixture of the inert gas and the oxygen-containing gas, (c) one or more thermocouples positioned inside the fluidized bed vessel for measuring an activation temperature inside the fluidized bed vessel, and (d) a controller configured to cycle the fluidizing gas between (i) the inert gas and (ii) the oxygen-containing gas or to adjust (iii) the mixture of the inert gas and the oxygen-containing gas, based on time intervals and/or based on the activation temperature measured by the one or more thermocouples.

Similar to the above described first and second processes for producing the activated chromium catalyst, the inert gas that can be utilized in the activation system can comprise (or consist essentially of, or consist of) nitrogen, argon, or a combination thereof; alternatively, nitrogen; or alternatively, argon. Likewise, the oxygen-containing gas utilized in the activation system can comprise (or consist essentially of, or consist of) oxygen, air, a mixture of oxygen and an inert gas (e.g., nitrogen), a mixture of air and an inert gas (e.g., nitrogen), and the like, as well as any combination thereof. The oxygen-containing gas can contain any suitable vol % of oxygen ranging from 1 to 40 vol %. In one aspect, the vol % of oxygen can be from 1 to 30 vol %, while in another aspect, the vol % of oxygen can be from 2 to 21 vol %, and in yet another aspect, the vol % of oxygen can be from 3 to 25 vol %, and in still another aspect, the vol % of oxygen can be from 4 to 10 vol %.

The supported chromium pre-catalyst treated in the fluidized bed vessel and activation system also can have any of the features and attributes of the pre-catalysts described above in relation to the first and second processes. Accordingly, the supported chromium pre-catalyst can have any total pore volume in a range from 0.5 to 5 mL/g, any BET surface area in a range from 100 to 700 m$^2$/g, and any d50 particle size in a range from 10 to 500 microns. Likewise, the supported chromium pre-catalyst comprises a suitable support (e.g., silica) and any amount of chromium in a range from 0.1 to 5 wt. % chromium, and optionally, any amount of titanium in a range from 0.1 to 10 wt. % titanium. These weight percentages are based on the total weight of the supported pre-catalyst.

The fluidized bed vessel of the activation system contains one or more heating zones, therefore, the fluidized bed vessel can have two or more heating zones, such as two heating zones, three heating zones, four heating zones, and so forth. The heating zones can have independent control of temperature, if desired. Similarly, the activation system contains one or more thermocouples, therefore, the system can have two or more thermocouples, such as two thermocouples, three thermocouples, four thermocouples, and so forth. There is no particular limit on the number of thermocouples that can be positioned within the fluidized bed vessel to measure the prevailing activation temperature inside the vessel.

While the activation systems of this invention are not limited by the methodology for introducing a fluidizing gas (or gasses) into the fluidized bed vessel, in one aspect, the one or more fluidizing gas inlets can comprise an inert gas inlet line and an oxygen-containing gas inlet line. In this aspect, the controller can be further configured to cycle between (1) introducing the inert gas into the fluidized bed vessel through the inert gas inlet line by opening a first valve on the inert gas inlet line and closing a second valve on the oxygen-containing gas inlet line, and (2) introducing the oxygen-containing gas into the fluidized bed vessel through the oxygen-containing gas inlet line by opening the second value and closing the first valve. In another aspect, the one or more fluidizing gas inlets can comprise one fluidizing gas inlet. In this aspect, the controller can be further configured to cycle between (1) introducing the inert gas into the fluidizing gas inlet through an inert gas inlet line by opening a first valve on the inert gas inlet line and closing a second valve on an oxygen-containing gas inlet line, and (2) introducing the oxygen-containing gas into the fluidizing gas inlet through the oxygen-containing gas inlet line by opening the second value and closing the first valve.

In these aspects, the controller can be further configured to adjust durations of feeding the inert gas independently ranging from 10 sec to 15 min (e.g., from 10 sec to 5 min, from 10 sec to 1 min, from 1 min to 10 min, from 1 min to 5 min, from 20 sec to 10 min, or from 20 sec to 2 min, and so forth) and durations of feeding the oxygen-containing gas independently ranging from 10 sec to 15 min (e.g., from 10 sec to 5 min, from 10 sec to 1 min, from 1 min to 10 min, from 1 min to 5 min, from 20 sec to 10 min, from 20 sec to 2 min, or from 20 sec to 1 min, and so forth). Additionally or alternatively, the controller can be further configured to adjust an average duration of feeding the inert gas that is greater than that of an average duration of feeding the oxygen-containing gas.

Additionally or alternatively, the controller can be further configured to adjust any suitable number of cycles of introducing the inert gas followed by introducing the oxygen-containing gas, for instance, to control the exotherm that results upon exposure of the pre-catalyst to oxygen. While not limited thereto, the number of cycles usually is from 5 to 50, but more often, the number of cycles is from 5 to 40, from 5 to 30, from 6 to 50, from 6 to 40, from 6 to 25, from 7 to 40, from 7 to 25, from 10 to 50, from 10 to 25, or from 10 to 20.

Additionally or alternatively, the controller can be further configured to adjust cycles of introducing the inert gas and introducing the oxygen-containing gas to maintain an average increase in the activation temperature from 0.5 to 10° F./min (0.3 to 6° C./min) in a temperature range from a lower temperature in the 250° F. to 700° F. (121° C. to 371° C.) range up to a higher temperature in the 700° F. to 950° F. (371° C. to 510° C.) range. Other suitable ranges for the average temperature rate increase include, for instance, from 1 to 5° F./min (0.6 to 3° C./min), from 1.5 to 4° F./min (0.8 to 2.2° C./min), or from 2 to 3.5° F./min (1 to 2° C./min), and the like.

As above, while the activation systems of this invention are not limited by the methodology for introducing a fluidizing gas (or gasses) into the fluidized bed vessel, in yet another aspect, the one or more fluidizing gas inlets can comprise one fluidizing gas inlet. In this aspect, the controller can be further configured to adjust the mixture of the inert gas and the oxygen-containing gas in the fluidizing gas inlet by controlling (or metering) a first flow rate of the inert gas through an inert gas inlet line into the fluidizing gas inlet and a second flow rate of the oxygen-containing gas through an oxygen-containing gas inlet line into the fluidizing gas inlet.

In this aspect, the controller can be further configured to control relative amounts of the inert gas and the oxygen-containing gas in the mixture at any suitable vol % of oxygen, for instance, to control the exotherm that results upon exposure of the pre-catalyst to oxygen. While not limited thereto, the amount of oxygen usually is from 1 to 10 vol %, but more often, from 1 to 8 vol %, from 2 to 8 vol %, from 2 to 7 vol %, or from 3 to 6 vol % oxygen is utilized in the mixture.

Additionally or alternatively, the controller can be further configured to adjust the mixture of the inert gas and the oxygen-containing gas (e.g., to contain any suitable vol % of oxygen) to maintain an average increase in the activation temperature from 0.5 to 10° F./min (0.3 to 6° C./min) in a temperature range from a lower temperature in the 250° F. to 700° F. (121° C. to 371° C.) range up to a higher temperature in the 700° F. to 950° F. (371° C. to 510° C.) range. Other suitable ranges for the average temperature rate increase include, for instance, from 1 to 5° F./min (0.6 to 3° C./min), from 1.5 to 4° F./min (0.8 to 2.2° C./min), or from 2 to 3.5° F./min (1 to 2° C./min), and the like.

As described herein, the controller is configured to cycle the fluidizing gas between (i) the inert gas and (ii) the oxygen-containing gas or to adjust (iii) the mixture of the inert gas and the oxygen-containing gas, based on time intervals and/or based on the activation temperature measured by the one or more thermocouples. In an aspect, the controller can be further configured to determine an exothermic increase in the activation temperature measured by the one or more thermocouples. In this aspect, the exothermic increase is considered to be a temperature increase of at least 30° F. (17° C.) within 5 min. Additionally or alternatively, the controller can be further configured to determine an exothermic increase in the activation temperature measured by the one or more thermocouples, and in this scenario, the presence of an exotherm can be determined by the second derivative of temperature versus time being positive (acceleration of temperature versus time). Accordingly, the controller can determine when an exotherm is occurring and then, in some aspects, cycle the fluidizing gas between (i) the inert gas and (ii) the oxygen-containing gas to minimize or eliminate the exotherm by increasing the inert gas injections relative to those of the oxygen-containing gas, and in other aspects, adjust (iii) the mixture of the inert gas and the oxygen-containing gas to contain a lower vol % of oxygen to minimize or eliminate the exotherm.

Herein, the activation system can be operated batchwise or continuously, or any one or more components of the system (e.g., the fluidized be vessel) in the system can be operated batchwise or continuously. Any suitable fluidizing gas velocity can be employed in the fluidized bed vessel.

Ordinarily, the one or more fluidizing gas inlets are configured to introduce the fluidizing gas into the fluidized bed vessel at a linear velocity of from 0.05 to 0.6 ft/sec. Other suitable ranges include, but are not limited to, from 0.05 to 0.3 ft/sec, from 0.1 to 0.4 ft/sec, from 0.2 to 0.5 ft/sec, from 0.2 to 0.4 ft/sec, or from 0.2 to 0.3 ft/sec, and the like.

Referring now to FIG. 1, which illustrates catalyst activation system 100 consistent with aspects of this disclosure. Activation system 100 includes fluidized bed vessel 110, heating zones 112, 118, thermocouples 120, fluidized catalyst particles 125, gas inlet line 165, gas distribution plate 170, and controller 190. In FIG. 1, an inert gas (e.g., nitrogen) is conveyed from inert gas source 130 through inert inlet line 135 to gas inlet line 165. Inert gas flows through inert gas valve 140 (when valve 140 is open) into gas inlet line 165 and subsequently through gas distribution plate 170 in fluidized bed vessel 110, with gas flow direction 175 upward through fluidized bed vessel 110.

Similarly, an oxygen-containing gas (e.g., air) in FIG. 1 is conveyed from oxygen source 150 through oxygen inlet line 155 to gas inlet line 165. An oxygen-containing gas flows through oxygen valve 160 (when valve 160 is open) into gas inlet line 165 and subsequently through gas distribution plate 170 in fluidized bed vessel 110, with gas flow direction 175 upward through fluidized bed vessel 110. Effluent treatment 180 is provided at the top exit from fluidized bed vessel 110, and this can include a filtration apparatus to remove catalyst particles as well as a mechanism for recycle of the fluidizing gas.

In FIG. 1, information or data 185 on parameters within activation system 100, such as the activation temperature in fluidized bed vessel 110 measured by thermocouples 120, can be provided to controller 190, which can then control or adjust 195 any component or operational variable within activation system 100. For example, controller 190 can cycle between introducing the inert gas into gas inlet line 165 through inert inlet line 135 by opening inert gas valve 140 and closing oxygen valve 160, and introducing the oxygen-containing gas into gas inlet line 165 through oxygen inlet line 155 by opening oxygen valve 160 and closing inert gas valve 140. Thus, if information or data 185 from thermocouples 120 indicate that the activation temperature in fluidized bed vessel 110 is increasing rapidly (e.g., an exotherm), controller 190 can open inert gas valve 140 and close oxygen valve 160, thereby reducing the rate of temperature increase.

In a variation of FIG. 1 described above, when inert gas valve 140 and oxygen valve 160 are metering valves, a mixture of the inert gas and the oxygen-containing gas can be introduced into the fluidized bed vessel 110 through gas inlet line 165. Controller 190 can adjust the relative amount of the inert gas in inert inlet line 135 flowing through inert gas (metering) valve 140 and the relative amount of the oxygen-containing gas in oxygen inlet line 155 flowing through oxygen (metering) valve 160 to provide a target amount (vol %) of oxygen feeding through gas distribution plate 170 in fluidized bed vessel 110.

Figure 2:
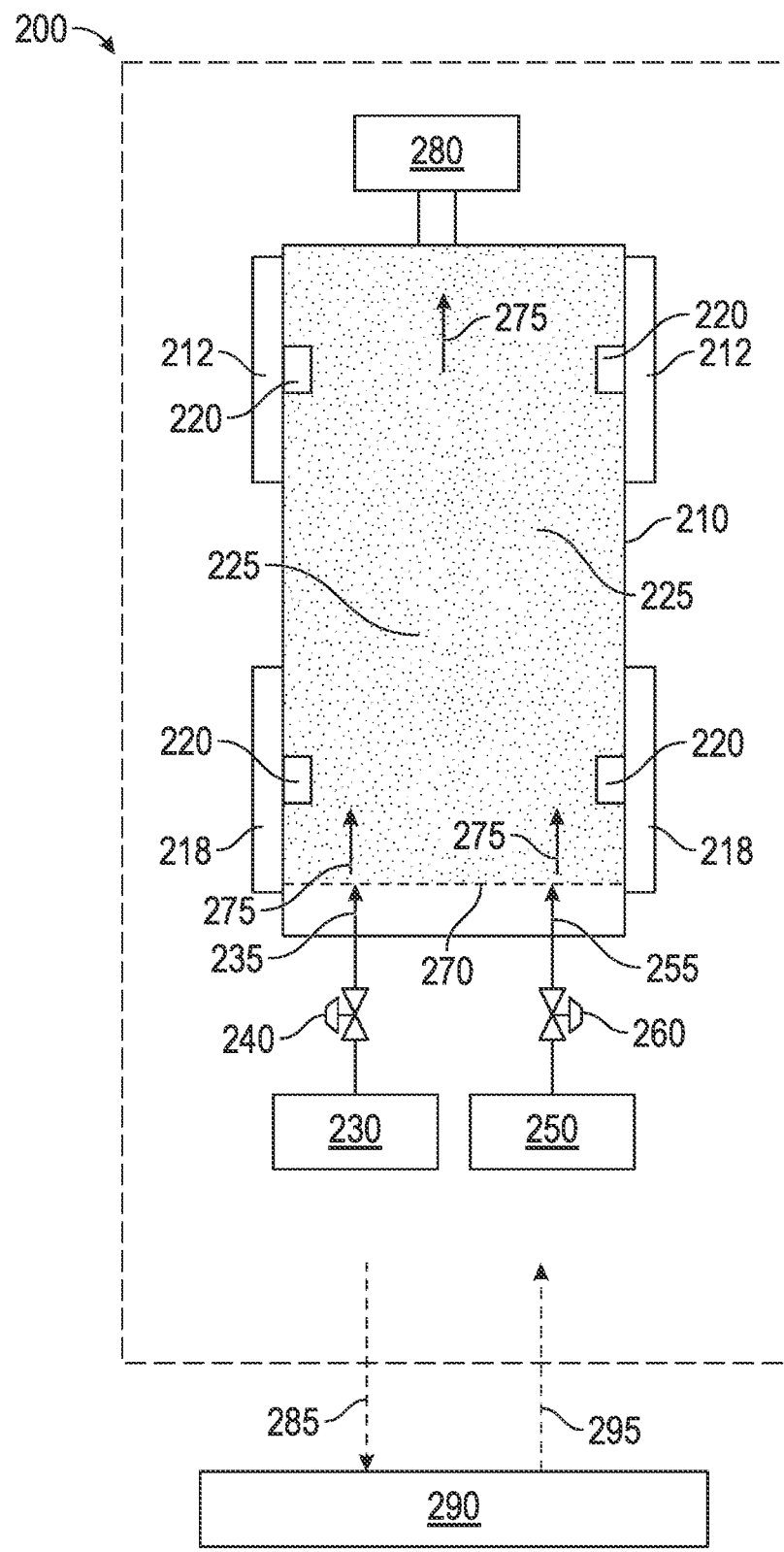
FIG. 2 illustrates a catalyst activation system consistent with another aspect of the present disclosure.

Referring now to FIG. 2, which illustrates catalyst activation system 200 consistent with another aspect of this disclosure. The reference numerals in FIG. 2 are generally the same as described for the similarly numbered components in FIG. 1, with the following exceptions. In FIG. 2, an inert gas (e.g., nitrogen) is conveyed from inert gas source 230 through inert inlet line 235 and through inert gas valve 240 (when valve 240 is open) and subsequently through gas distribution plate 270 in fluidized bed vessel 210, with gas flow direction 275 upward through fluidized bed vessel 210.

Similarly, an oxygen-containing gas (e.g., air) in FIG. 2 is conveyed from oxygen source 250 through oxygen inlet line 255 and through oxygen valve 260 (when valve 260 is open) and subsequently through gas distribution plate 270 in fluidized bed vessel 210, with gas flow direction 275 upward through fluidized bed vessel 210.

Accordingly, in a manner similar to FIG. 1, controller 290 in FIG. 2 can cycle between introducing the inert gas into fluidizing bed vessel 210 through inert inlet line 235 by opening inert gas valve 240 and closing oxygen valve 260, and introducing the oxygen-containing gas into fluidized bed vessel 210 through oxygen inlet line 255 by opening oxygen valve 260 and closing inert gas valve 240. Thus, if information or data 285 from thermocouples 220 indicate that the temperature in fluidized bed vessel 210 is increasing rapidly (e.g., an exotherm), controller 290 can open inert gas valve 240 and close oxygen valve 260, thereby reducing the rate of temperature increase.

Polymerization Processes

Olefin polymers (e.g., ethylene polymers) can be produced using the activated chromium catalysts and any suitable olefin polymerization process using various types of polymerization reactors, polymerization reactor systems, and polymerization reaction conditions. One such olefin polymerization process can comprise (I) performing any process (e.g., the first process or the second process) to produce the activated chromium catalyst disclosed herein, and (II) contacting the activated chromium catalyst and an optional co-catalyst with an olefin monomer and an optional olefin comonomer in a polymerization reactor system under polymerization conditions to produce an olefin polymer. This invention also encompasses any olefin polymers (e.g., ethylene polymers) produced by any of the polymerization processes disclosed herein.

The activated chromium catalyst produced by the first process or the second process (and an optional co-catalyst) can be contacted with an olefin monomer and an optional olefin comonomer in a polymerization reactor system under polymerization conditions to produce an olefin polymer. Alternatively, a mixture of the activated chromium catalyst produced by the first process or the second process with another activated chromium catalyst produced or activated by either the first process, the second process, or another process (and an optional co-catalyst), can be contacted with an olefin monomer and an optional olefin comonomer in a polymerization reactor system under polymerization conditions to produce an olefin polymer.

In the polymerization processes, a co-catalyst can be utilized with the activated chromium catalyst. In one aspect, the co-catalyst can comprise an aluminoxane compound, an organoaluminum compound, or an organoboron compound, and this includes combinations of more than co-catalyst compound. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Representative and non-limiting examples of organoaluminums include triethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or any combination thereof. Representative and non-limiting examples of organoborons include tri-n-butyl borane, tripropylborane, triethylborane, and the like, or any combination thereof. Co-catalysts that can be used are not limited to the co-catalysts described above. Other suitable co-catalysts (such as organomagnesiums and organolithiums) are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485.

As used herein, a "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high-pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608. Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327.

According to still another aspect, the polymerization reactor system can comprise a high-pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously or pulsed).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from 60° C. to 280° C., for example, or from 60° C. to 120° C., depending upon the type of polymerization reactor(s). In some reactor systems, the polymerization temperature generally can be within a range from 70° C. to 105° C., or from 75° C. to 100° C.

Suitable pressures will also vary according to the reactor and polymerization type. The pressure for liquid phase polymerizations in a loop reactor is typically less than 1000 psig (6.9 MPa). Pressure for gas phase polymerization is usually at 200 to 500 psig (1.4 MPa to 3.4 MPa). High pressure polymerization in tubular or autoclave reactors is generally run at 20,000 psig to 75,000 psig (138 MPa to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Olefin monomers that can be employed with the activated chromium catalysts and polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin or a $C_3$-$C_{20}$ alpha-olefin). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

In an aspect, the polymerization process can be performed at a productivity of from 2000 to 5000 g polymer per gram of catalyst, and/or at a space-time yield of greater than or equal to 2, 2.5, 2.8, 3, or 4 (lb/hr)/gal and/or less than or equal to 6, 5.5, or 5 (lb/hr)/gal, in a commercial loop reactor making at least a 0.947 g/cc density ethylene/1-hexene copolymer as determined by ISO 1183 part 2. The space-time yield can fall within a range from any minimum value to any maximum value listed above, therefore representative and non-limiting ranges for the space-time yield include from 2 to 6, from 2 to 5, from 2.5 to 5.5, from 2.8 to 6, from 3 to 6, from 3 to 5.5, from 4 to 6, or from 4 to 5 (lb/hr)/gal.

In another aspect, the polymerization process can performed at a productivity of from 2000 to 5000 g polymer per gram of catalyst, and/or at a space-time yield of greater than or equal to 2, 2.5, 2.8, 3, or 4 (lb/hr)/gal and/or less than or equal to 6, 5.5, or 5 (lb/hr)/gal, in a commercial loop reactor making at least a 0.938 g/cc density ethylene/1-hexene copolymer as determined by ISO 1183 part 2. As above, the space-time yield can fall within a range from any minimum value to any maximum value listed above, and therefore representative and non-limiting ranges for the space-time yield include from 2 to 6, from 2 to 5, from 2.5 to 5.5, from 2.8 to 6, from 3 to 6, from 3 to 5.5, from 4 to 6, or from 4 to 5 (lb/hr)/gal.

Ethylene Polymers and Olefin Polymers

This invention is also directed to, and encompasses, the olefin polymers produced using any of the chromium catalysts and polymerization processes disclosed herein. Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including any combinations thereof. In one aspect, the olefin polymer can comprise an ethylene homopolymer, an ethylene/1-butene copolymer, an ethylene/1-hexene copolymer, and/or an ethylene/1-octene copolymer, while in another aspect, the olefin polymer can comprise an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

An illustrative and non-limiting example of a first ethylene polymer (e.g., an ethylene/α-olefin copolymer)—produced using the activated chromium catalysts disclosed herein—can have a high load melt index (HLMI) in a range from 10 to 80 g/10 min, a density in a range from 0.93 to 0.96 g/cm$^3$, and a total film gel count of less than or equal to 100 gels per ft$^2$ of 25 micron thick film (or less than or equal to 80, or less than or equal to 60, or less than or equal to 40, or less than or equal to 30, or less than or equal to 20, or less than or equal to 10, or less than or equal to 5, gels per ft$^2$ of 25 micron thick film), wherein film gels encompass a size greater than 200 μm. Alternatively, the gel count of gels>200 microns that are caused by unfragmented catalyst particles (e.g., unfragmented Cr/silica catalyst particles) can be less than or equal to 100 gels per ft$^2$ of 25 micron thick film, or less than or equal to 80, or less than or equal to 60, or less than or equal to 40, or less than or equal to 30, or less than or equal to 20, or less than or equal to 10, or less than or equal to 5, gels per ft$^2$ of 25 micron thick film The ethylene polymer contains a total (both disintegrated and non-fragmented) of from 150 to 680 ppm silica, from 1.5 to 6.8 ppm chromium, and from 1.5 to 40 ppm titanium (when present).

An illustrative and non-limiting example of a second ethylene polymer (e.g., an ethylene/α-olefin copolymer) can have a melt index (MI) in a range from 0.1 g/10 min to 1 g/10 min, a density in a range from 0.93 to 0.96 g/cm$^3$, and a total film gel count (or a catalyst particle gel count) of less than or equal to 100 gels per ft$^2$ of 25 micron thick film (or less than or equal to 80, or less than or equal to 60, or less than or equal to 40, or less than or equal to 30, or less than or equal to 20, or less than or equal to 10, or less than or equal to 5, gels per ft$^2$ of 25 micron thick film), wherein film gels encompass a size greater than 200 μm (and can be caused by unfragmented catalyst particles for the catalyst particle gel count). The ethylene polymer contains from 150 to 680 ppm silica, from 1.5 to 6.8 ppm chromium, and from 1.5 to 40 ppm titanium (when present).

Further, these illustrative first and second ethylene polymers (which are typically in the form of pellets or beads) consistent with the present invention also can have any of the polymer properties listed below and in any combination, unless indicated otherwise.

The density of the ethylene-based polymers often can range from 0.93 to 0.96 or from 0.93 to 0.956 g/cm$^3$. In one aspect, the density can range from 0.934 to 0.96, from 0.934 to 0.956 in another aspect, from 0.934 to 0.95 in yet another aspect, or from 0.945 to 0.958 g/cm$^3$ in still another aspect.

The ethylene polymers can have a variety of melt flow properties, such as indicated by the high load melt index (HLMI) in a range from 10 to 80 g/10 min. In some aspects, the HLMI of the ethylene polymers can fall within a range from to 10 to 70, from 10 to 60, from 10 to 50, from 20 to 80, from 20 to 50, or from 30 to 50 g/10 min, and the like. Additionally or alternatively, these ethylene polymers can have melt index (MI) from 0.1 to 1 g/10 min, and more often, from 0.1 to 0.75, from 0.1 to 0.6, from 0.2 to 1, from 0.2 to 0.6, or from 0.3 to 0.6 g/10 min, and the like.

In an aspect, the ethylene polymers can have a Mw in a range from 100,000 to 250,000, from 120,000 to 200,000, or from 140,000 to 180,000 g/mol. For instance, the Mw can be less than or equal to 180,000, less than or equal to 170,000, or less than or equal to 160,000 g/mol. Additionally or alternatively, the ethylene polymer can have a Mn from 3,000 to 25,000, from 8,000 to 20,000, from 10,000 to 18,000, or from 12,000 to 15,000 g/mol. For instance, the Mn can be less than or equal to 15,000, less than or equal to 14,000, or less than or equal to 13,000 g/mol. Additionally or alternatively, the ethylene polymers can have a Mz from 500,000 to 2,000,000, from 500,000 to 1,800,000, or from 600,000 to 1,500,000 g/mol. For instance, the Mz can be less than or equal to 1,300,000, less than or equal to 1,100,000, or less than or equal to 1,000,000 g/mol. While not limited thereto, these ethylene polymers can have a ratio of Mw/Mn in a range from 7 to 20, such as from 8 to 18, from 9 to 17, from 9 to 15, or from 10 to 14. For instance, the Mw/Mn can be less than or equal to 14, less than or equal to 13, less than or equal to 12.5, or less than or equal to 11.5. Similarly, representative ranges for the ratio of Mz/Mw include from 5 to 10, from 5 to 9, from 6 to 10, or from 6 to 9. For instance, the Mz/Mw can be less than or equal to 8, less than or equal to 7.5, less than or equal to 7, less than or equal to 6.5, or less than or equal to 6.

Additionally or alternatively, these ethylene polymers can have a CY-a parameter of from 0.1 to 0.3 in one aspect, from 0.14 to 0.3 in another aspect, from 0.15 to 0.28 in another aspect, from 0.16 to 0.26 in another aspect, from 0.17 to 0.24 in yet another aspect, and from 0.18 to 0.22 in still another aspect. For instance, the CY-a parameter can be less than or equal to 0.18, less than or equal to 0.17, less than or equal to 0.165, less than or equal to 0.16, less than or equal to 0.155, or less than or equal to 0.15. This rheological parameter is determined from viscosity data measured at 190° C. and using the Carreau-Yasuda (CY) empirical model described herein.

Moreover, the ethylene polymers are produced with a supported activated chromium catalyst, as discussed herein. Ziegler-Natta and metallocene based catalyst systems are not required. Therefore, the ethylene polymers can contain no measurable amount of zirconium or hafnium or vanadium or magnesium (catalyst residue), i.e., less than 0.1 ppm by weight. In some aspects, the ethylene polymers can contain, independently, less than 0.08 ppm, less than 0.05 ppm, or less than 0.03 ppm, of zirconium (or hafnium, or vanadium, or magnesium). The amounts of these elements can be determined by ICP analysis on a PerkinElmer Optima 8300 instrument. Polymer samples can be ashed in a Thermolyne furnace with sulfuric acid overnight, followed by acid digestion in a HotBlock with HCl and HNO$_3$ (3:1 v:v).

Instead, the ethylene polymers typically contain from 1.5 to 6.8 ppm chromium, from 1.5 to 40 ppm titanium (when present), and from 150 to 680 ppm silica (by weight). Other illustrative ranges for the chromium content of these ethylene polymers include, but are not limited to, from 1.8 to 6 ppm, from 2 to 6.8 ppm, from 2 to 6 ppm, from 2 to 5 ppm, from 1.5 to 6 ppm, from 1.5 to 5.5 ppm, from 1.5 to 5 ppm, or from 3 to 6 ppm of chromium. Other illustrative ranges for the titanium content of these ethylene polymers include, but are not limited to, from 1.5 to 30 ppm, from 2 to 40 ppm, from 2 to 30 ppm, from 2 to 10 ppm, from 3 to 30 ppm, from 3 to 20 ppm, from 3 to 10 ppm, from 4 to 20 ppm, from 5 to 40 ppm, from 5 to 20 ppm, or from 5 to 15 ppm of titanium (when present). Other illustrative ranges for the silica content of these ethylene polymers include, but are not limited to, from 180 to 600 ppm, from 200 to 680 ppm, from 200 to 600 ppm, from 200 to 500 ppm, from 150 to 600 ppm, from 150 to 550 ppm, or from 150 to 500 ppm of silica. The silica content of the polymer is quantified by an ash test.

The gel count amounts can be based on the total film gel count (all film defects greater than 200 microns in diameter) or the catalyst particle gel count (film defects greater than 200 microns in diameter that are caused by catalyst particles) of number of gels per ft$^2$ of 25 micron thick film of the ethylene polymer. Most of the gels in chromium-derived polymers are catalyst particle gels (hard gels) that arise from the supported catalyst particle. When these supported chromium catalysts are used to polymerize ethylene, most of the catalyst particles are broken or disintegrated into imperceptibly small fragments that are dispersed in the final polymer, causing no problems, especially in thin film products. However, depending on the polymerization conditions, some catalyst particles can be ejected from the reactor before becoming active and thus before being disintegrated by polymerization. These non-fragmented catalyst particles can result in visual imperfections on the surface of the final product or article, usually called "gels" or "hard gels" or "catalyst gels," and film grades are especially sensitive to this issue (notably, such catalyst particle gels also can create noticeable defects on the surfaces of thick parts, resulting in poor surface aesthetics of the final product or article, and such surface roughness also can interfere with printing operations). Consequently, polymer film grades typically have a rigid manufacturing specification on gels greater than 200 microns in diameter. During manufacture of the polymer, the polymer is formed into a 25 micron thick film and the number of gels is automatically measured by an in-line camera specially designed to count the gels greater than 200 microns in size. Total gel count includes catalyst particle gels as well as gels due to contamination from foreign material, or polymer particles, or additive particles, for example.

Typically, to qualify as a "gel" the optical imperfection recognized by the camera and computer on the gel analyzer must register the gel size as greater than 200 µm in diameter. From experience, catalyst particles of 100+µm diameter generally register as 200+µm gels, due to the polymer sometimes clinging to the catalyst particle, thus adding to its size, and also because of the "lens effect", in which the catalyst particle appears magnified by the lens-shaped polymer coating. The latter is an optical magnification of the catalyst particle's size due to the formation of a convex lens made of clear polymer that surrounds the catalyst particle. Thus, catalyst particle gels can be reduced by minimizing catalyst particles of 100 µm or more in size in the ethylene polymer.

Another unexpected benefit of the ethylene polymers produced using the supported chromium catalysts—activated as described herein—is improved processability, as compared to polymers produced with chromium catalysts that are activated conventionally (control or comparative examples, discussed further below). In extrusion processing for blown film, pipe, blow molding, and other converting applications, the extrusion pressure can be reduced by at least 3%, at least 5%, at least 8%, or at least 10%, or at least 15%, and in some instances, up to 20%, or more. This improved processability can be measured or quantified on a pelletizing extruder that forms the ethylene polymer into pellets or beads, or on an extruder that is used to produce film. Accordingly, the same holds true for pelletizing during manufacture of the inventive polymers. Again, the extrusion pressure can be reduced by at least 3%, 5%, 8%, 10%, or 15%, or up to 20%, or more.

Similarly, the melt temperature during extrusion, during molding, during pelletization, etc., is often lower with the inventive polymers. The extrusion melt temperature can typically drop by at least 5, 8, 10, 15, or 20, or up to 25° F. (3, 4, 6, 8, or 11, or up to 14° C.), or more. And the power consumption, as measured by amperage to the extruder, is also lowered during the respective extrusion process as compared to a polymer made from a control catalyst. This can typically be at least 5%, or at least 8%, or 10%, or 12%, or 15% lower. Further, the specific energy, or work imparted into the polymer, can be lowered at least 1%, or 2%, or 3%, or 4%.

Another benefit of polymers made by the catalysts of this invention is that they can often display enhanced mixing during extrusion. This is evidenced by a larger drop in melt index upon passage through the extruder, which indicates increased chain entanglement. The melt index change can be at least 0.21, or 0.22, or 0.23, or 0.24, or 0.25, or 0.26 g/10 min. When expressed as a percentage this can be at least a 30% drop in melt index, a 40% drop in melt index, a 42% drop in melt index, a 45% drop in melt index, or a 48% drop in melt index, and up to a 50%, 55%, or 60% drop in melt index, or more. The HLMI can also drop by a similar percentage.

Articles and Products

Articles of manufacture can be formed from, and/or can comprise, the olefin polymers (e.g., ethylene polymers) of this invention and, accordingly, are encompassed herein. For example, articles which can comprise the polymers of this invention can include, but are not limited to, an agricultural film, a geomembrane film, a packaging film, a pallet wrap film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992. In some aspects of this invention, an article of manufacture can comprise any of olefin polymers (or ethylene polymers) described herein, and the article of manufacture can be or can comprise a film (e.g., a blown film), a pipe, or a blow molded product.

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

Standard catalyst activation for a Comparative pre-catalyst in laboratory testing was performed as follows. Approximately 10 g of the pre-catalyst sample was placed in a 1.75-inch quartz tube fitted with a sintered quartz disk at the bottom. While the pre-catalyst was supported on the disk, dry air was blown up through the disk at a linear rate of 1.6-1.8 standard ft$^3$/hr (45-51 L/hr). An electric furnace around the quartz tube was then turned on and the temperature was raised at the rate of 400° C./hr to the target temperature, typically 650° C., was reached. At that temperature, the catalyst was fluidized for 3 hr in the dry air. Afterward, the catalyst was collected and stored under dry nitrogen, where the catalyst was protected from oxygen and moisture until ready for polymerization testing. The Comparative pre-catalyst was a commercially available titanated chromium/silica pre-catalyst containing 1 wt. % chromium and 2.5 wt. % titanium and having a BET surface area of 500 m$^2$/g, a pore volume of 2.5 mL/g, and an average (d50) particle size of 130 microns.

Figure 3:
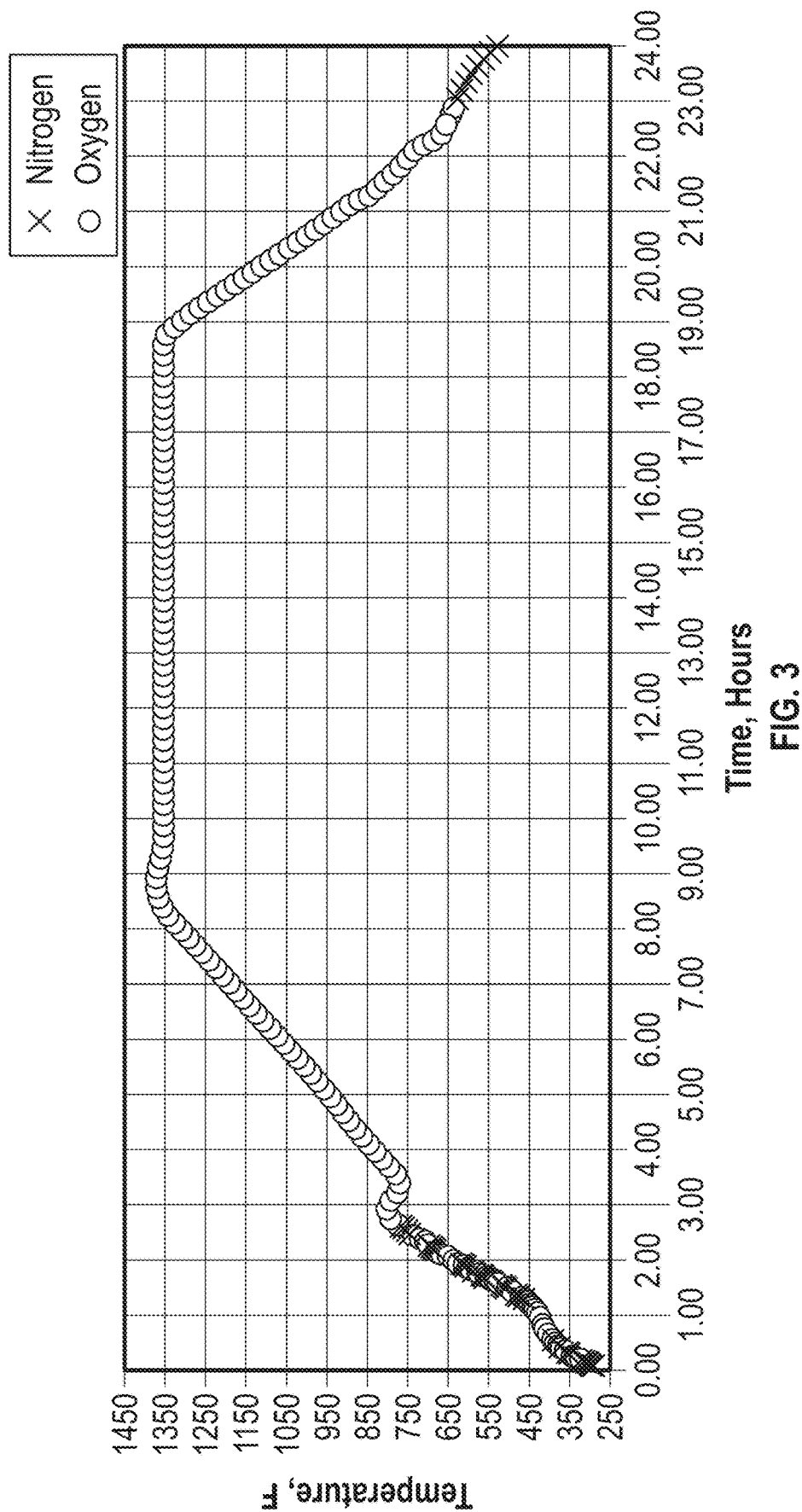
FIG. 3 presents a representative plot of temperature versus time for a method of activation encompassing that of Activation Methods 1-5.

Other catalyst activations (Activation Methods 1-5) were conducted in a large scale fluidized bed calciner, having a 42-in diameter, with gas flows of 0.1 ft/sec below 700° C. and 0.2 ft/sec above that temperature. The calciner had a design similar to the quartz lab activator, only constructed on a much larger scale. The recited temperature (in the calciner) was the average of three (3) thermocouples positioned at the top, bottom, and middle of the fluidized bed calciner. The temperature of the catalyst/pre-catalyst is effectively the same as the calciner temperature. FIG. 3 is a representation of the time-temperature activation sequence and the gas feed used—nitrogen or oxygen (air)—for Activation Methods 1-5, with the exception of the exotherm elimination portion occurring during the first hours, which are discussed in detail below.

The pre-catalyst used in Activation Methods 1-5 was prepared from 550 lb of silica (dry basis) having a BET surface area of 450 m$^2$/g and a pore volume of 1.9 mL/g. The d50 average particle size was 60 microns. The silica was charged to a 1000-gal reactor and combined with 2750 lb of deionized water. The slurry was stirred and other ingredients were added as summarized in Table 1 below. After all ingredients were added, the mixture was spray-dried to form the pre-catalyst.

TABLE 1

| Ingredient | lb |
| --- | --- |
| Titanium tetraisopropoxide | 114 |
| Oxalic acid dihydrate | 101 |
| Dimethyl formamide (DMF) | 88 |
| Chromium triacetate | 24.2 |

Figure 4:
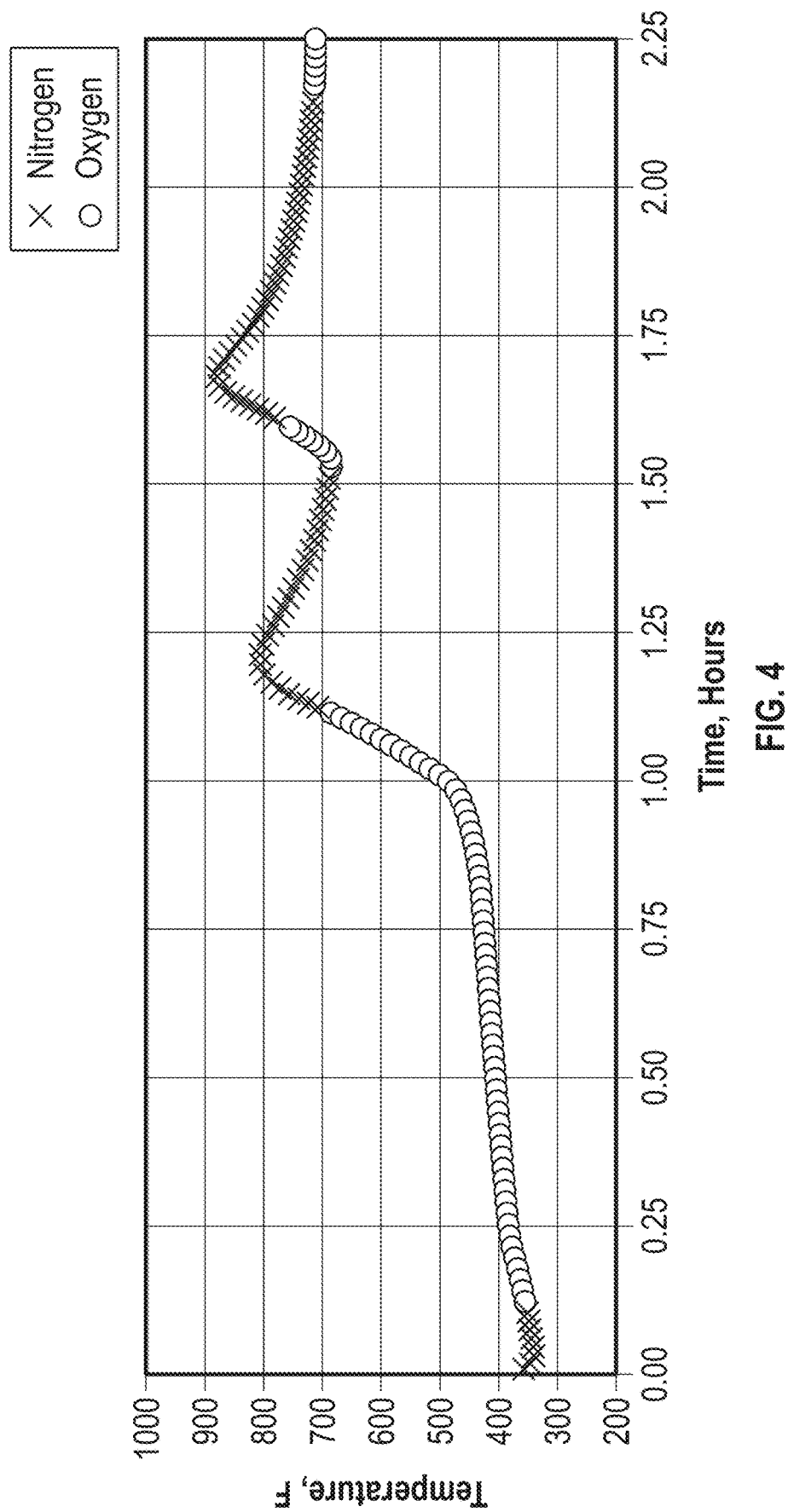
FIGS. 4-5, 6A-6B, 7A-7B, 8A-8B present plots of temperature versus time for the exotherm elimination portion of FIG. 3 for Activation Methods 1-5.

Activation Method 1: Approximately 625 lb of pre-catalyst was charged to the calciner under nitrogen in four unequal portions, while the temperature was at 600° F. (315° C.). The first portions were somewhat smaller than later ones. The temperature quickly dropped with each portion being charged, and the temperature after completion of charging was 350° F. (177° C.). The nitrogen gas flow was then changed to dry air and external heat was then applied to raise the temperature slowly. At about 450° F. (232° C.), the organics on the catalyst began to oxidize, thus releasing heat, that is, the exotherm started. The temperature then rose very quickly to 800° F. (427° C.). In order to stop the exotherm and prevent overheating and damage to the catalyst and calciner, the gas was changed back to nitrogen when the temperature reached 700° F. (371° C.). Nevertheless, the temperature continued to rise another 100° F. (56° C.) while the last air in the vessel was being flushed out and replaced by nitrogen. This is shown in FIG. 4, which plots the temperature as a function of time for the exotherm portion of the overall activation method. Note that the gas flow is either nitrogen or oxygen (air) and designated with different symbols.

The temperature slowly dropped back down to 700° F. (371° C.) and then the nitrogen gas was again changed to air. Once again, the exotherm started up very quickly and the temperature rapidly increased to almost 900° F. (482° C.) in this second cycle. Again, the gas was changed back to nitrogen at about 775° F. (413° C.) but the temperature continued to rise up to almost 900° F. (482° C.). The temperature then slowly cooled back down under nitrogen to 700° F. (371° C.), at which point the nitrogen was again replaced by air. This time, however, no further heat release was observed. The activation then was continued in air normally, being ramped up to the final hold temperature at 1350° F. (732° C.) as shown in FIG. 3.

Figure 5:
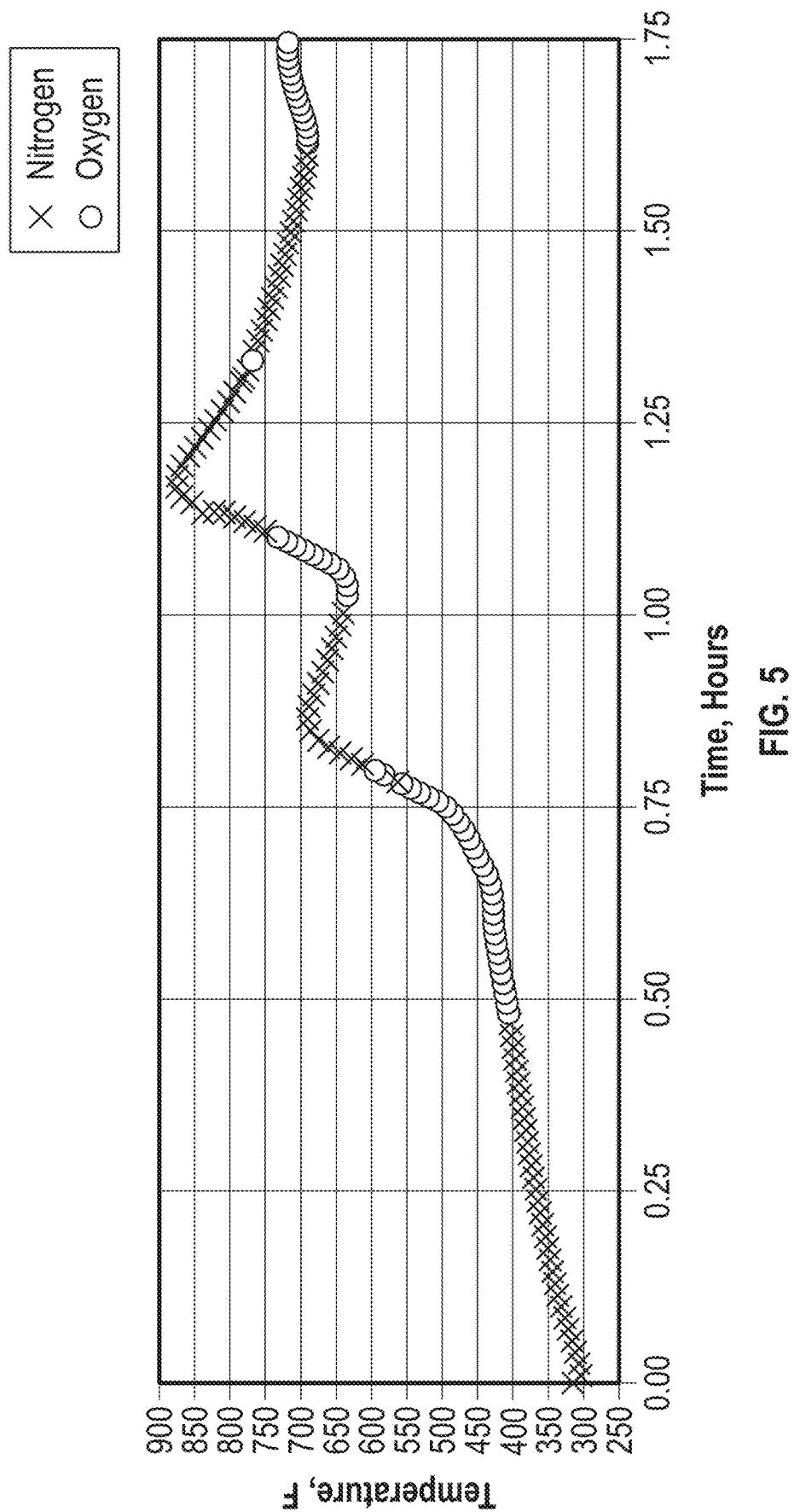
Figure 6A:
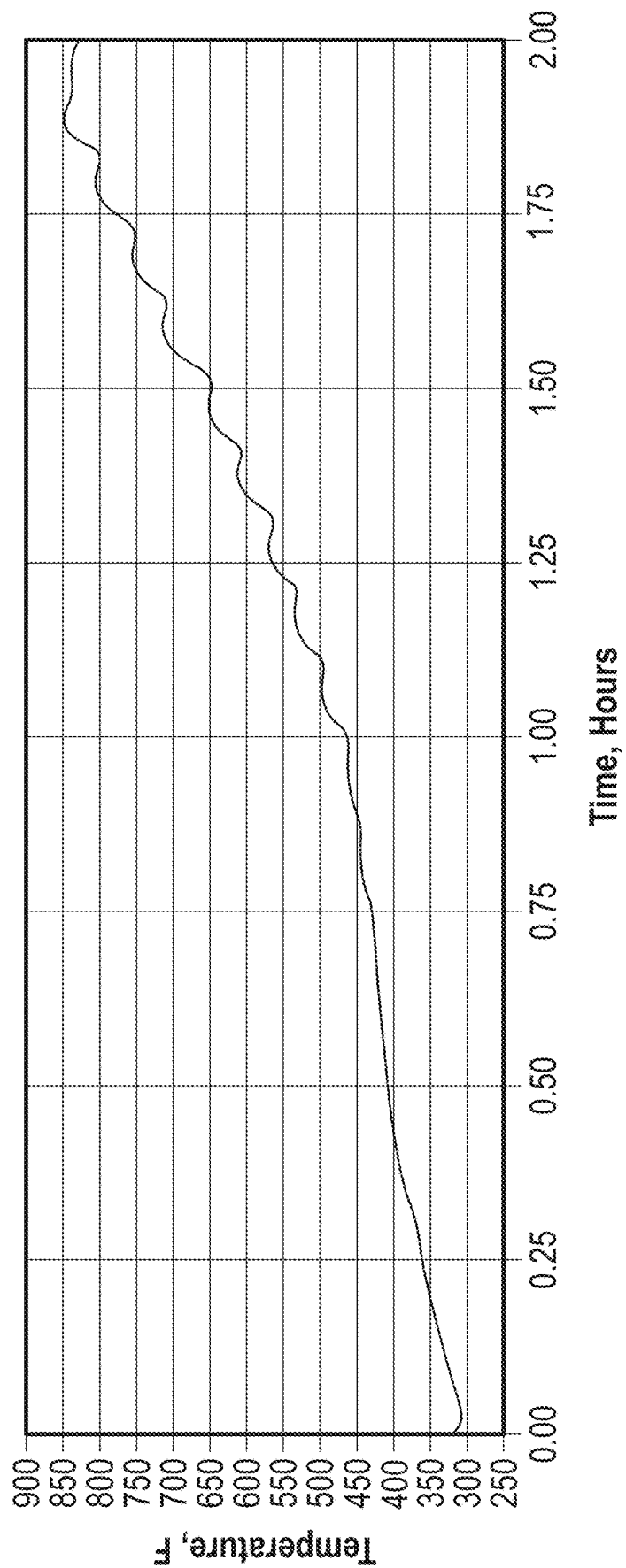
Figure 6B:
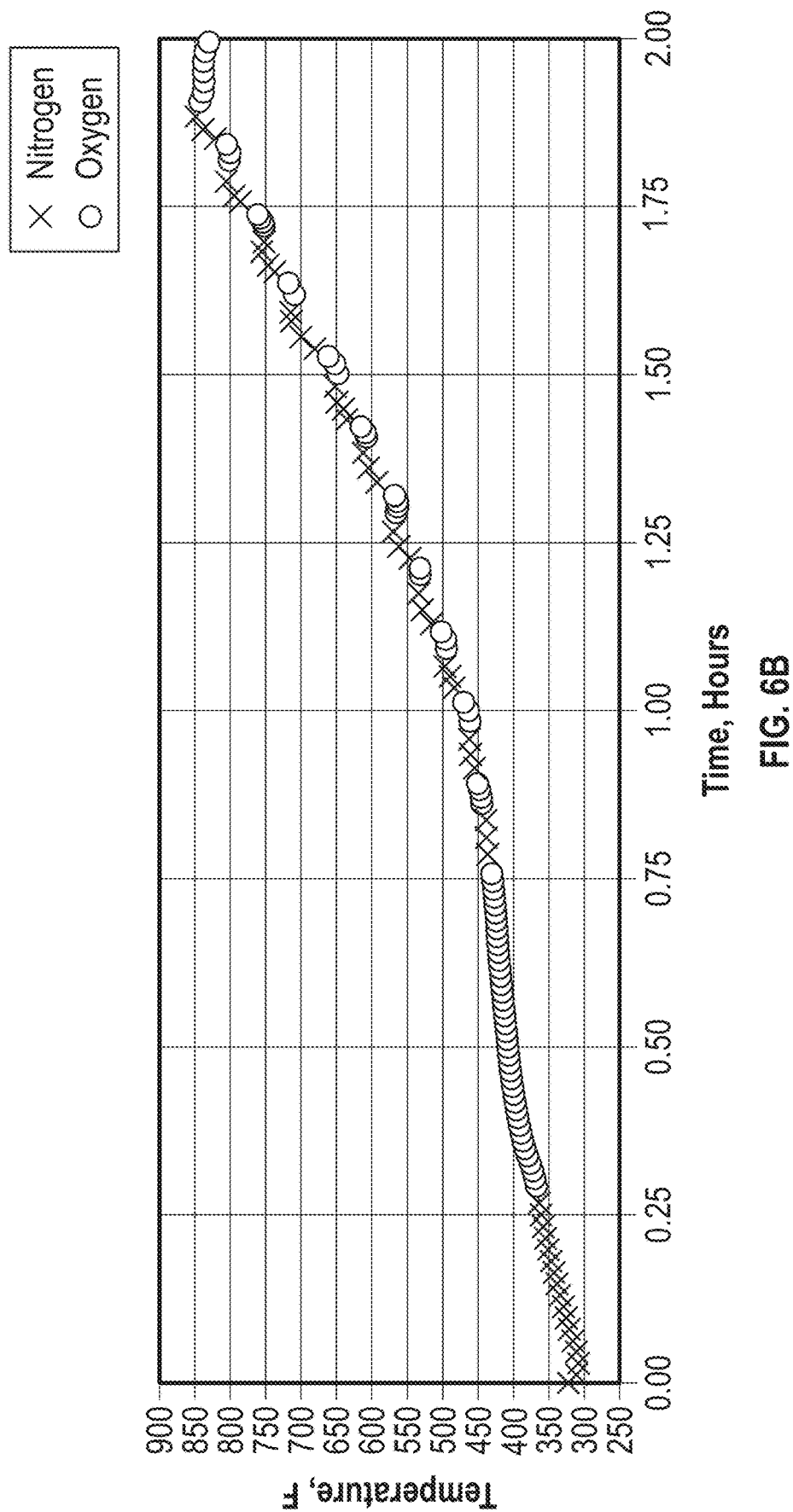
Figure 7A:
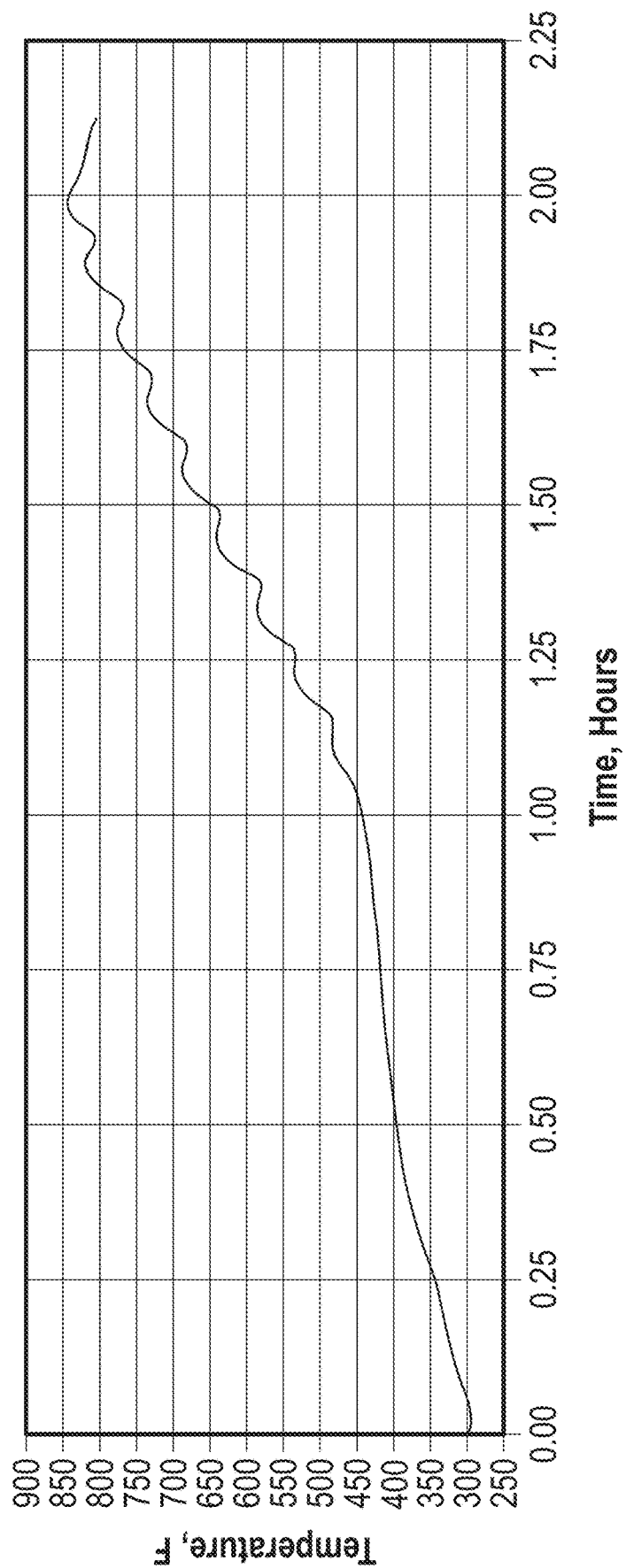
Figure 7B:
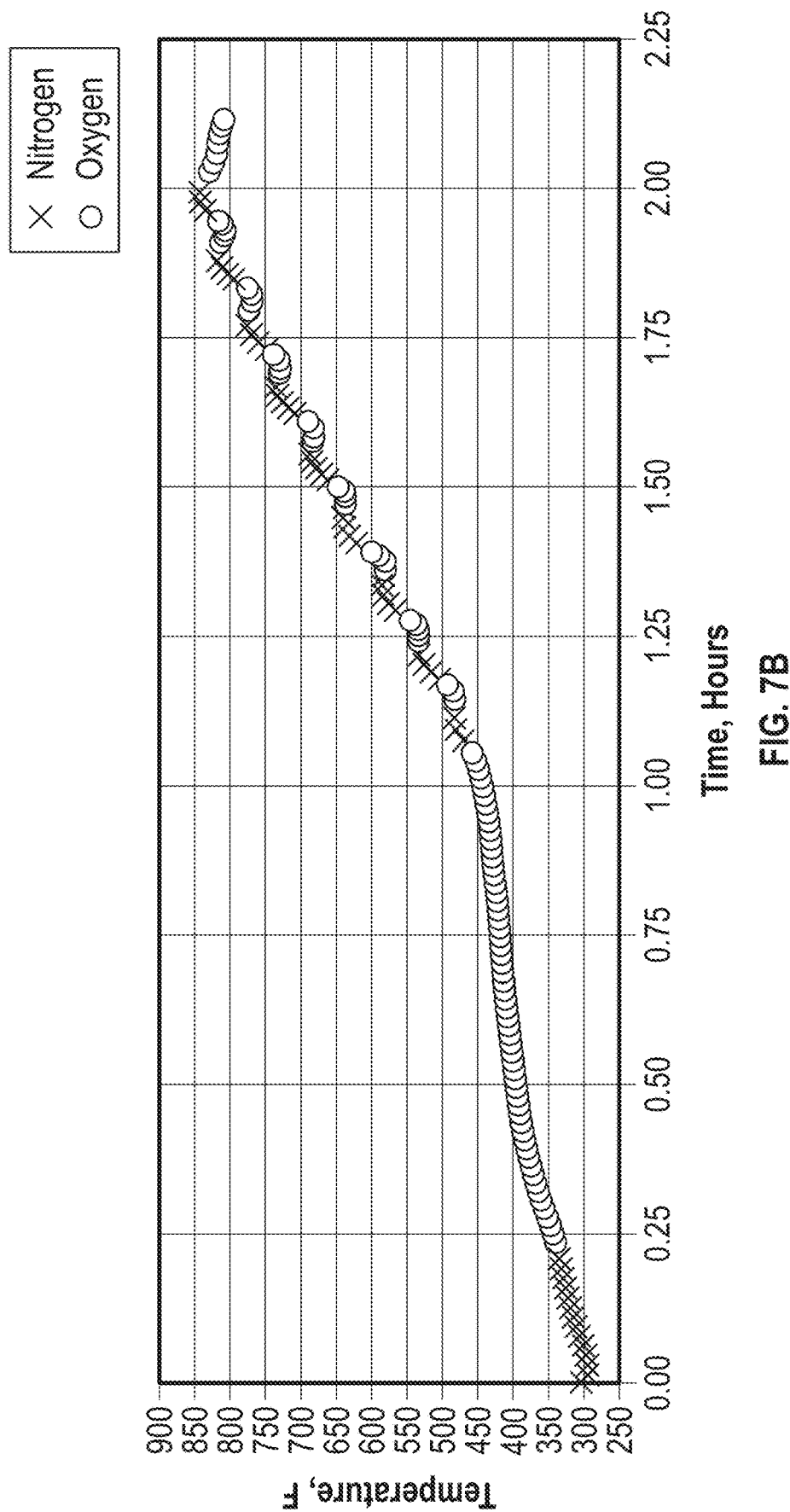

Activation Method 2: The general procedure of Activation Method 1 was followed. Again, two exotherm cycles were used, producing a similar temperature/time profile, which is shown in FIG. 5. After the exotherm had concluded, activation continued to 1350° F. (732° C.) in air as shown in FIG. 3.

Activation Methods 3-4: In these methods, the exotherm was controlled with much shorter cycles. In Activation Methods 3-4, the air was added in 2 min pulses, each followed by a 5 min pulse of nitrogen. This had the effect of greatly smoothing out the temperature rise accompanying the exotherm. FIGS. 6A-6B and FIGS. 7A-7B show the temperature/time profiles for the exotherm portion of the overall activation process. Note that the smooth rise in temperature is characterized by a series of small rises and drops, looking almost like a sine-wave or a staircase. After the exotherm had concluded, activation continued to 1350° F. (732° C.) in air as shown in FIG. 3.

Figure 8A:
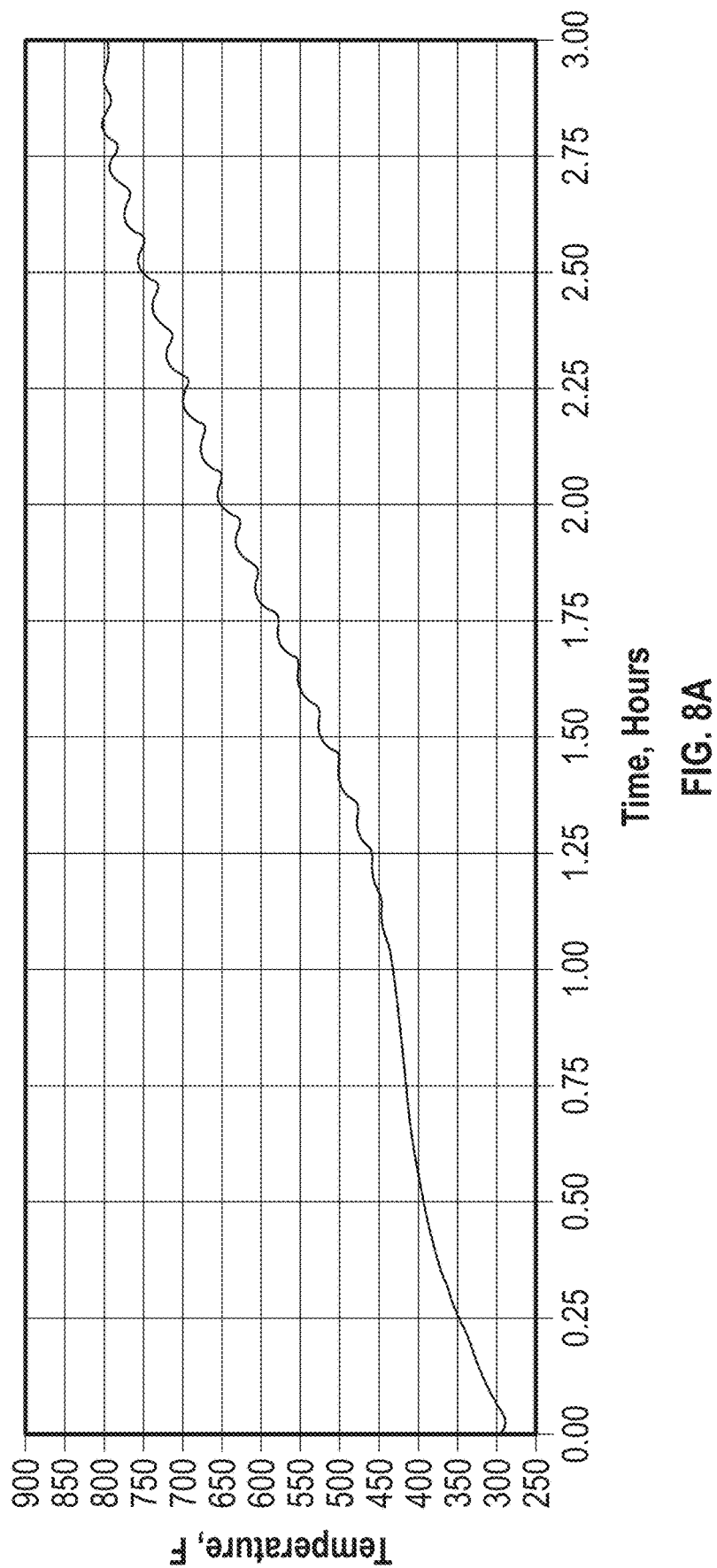
Figure 8B:
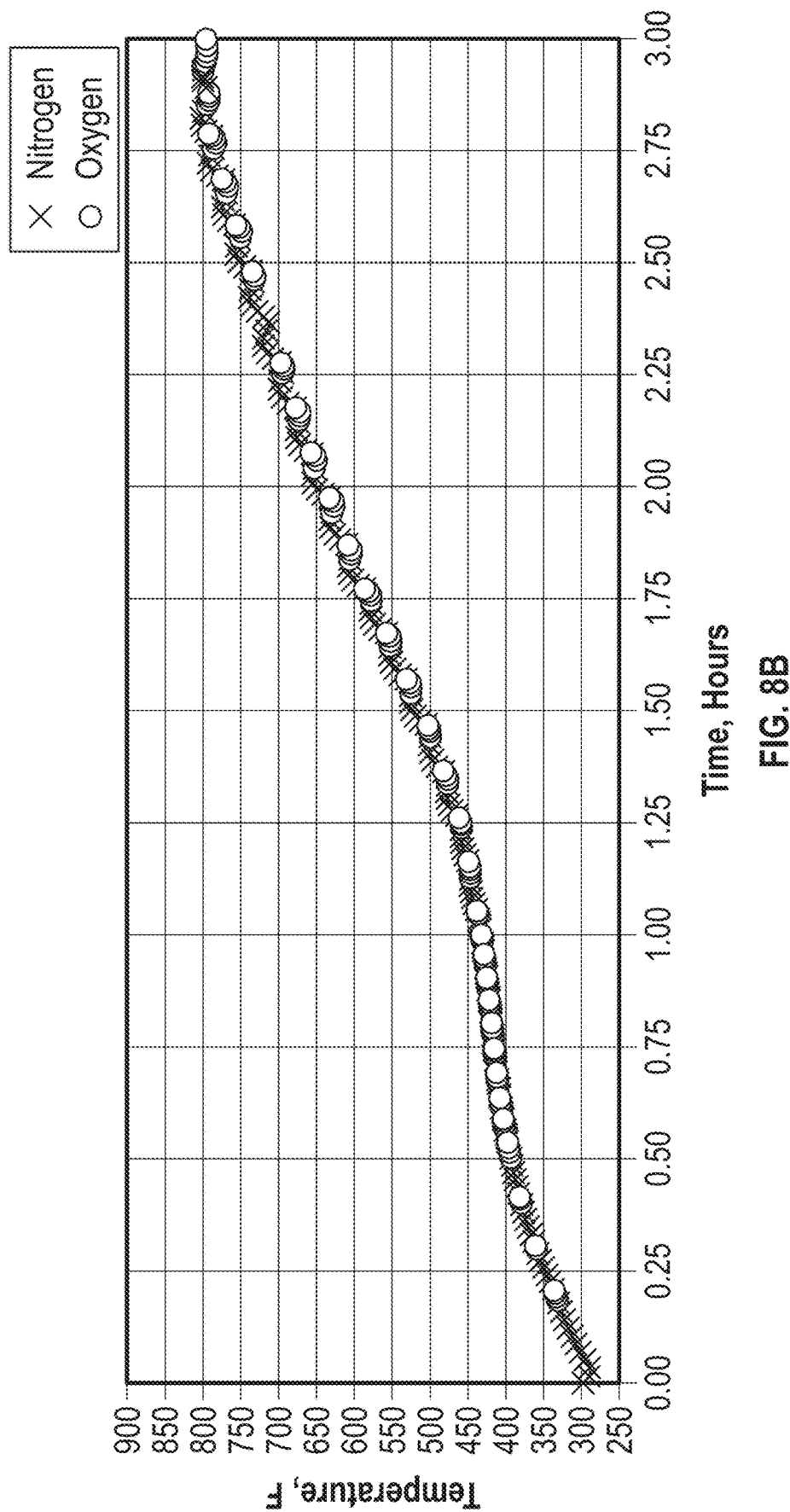

Activation Method 5: In Activation Method 5, an automated system was used to control the pulsing of nitrogen and the pulsing of air, and opening and closing the respective valves necessary to accomplish this process. Air was added in 40 sec pulses each followed by a 5 min pulse of nitrogen. The overall fluidizing gas velocity was maintained at the usual rate throughout this activation method as well as for the other activation methods. The smaller, automatically generated, pulses further smoothed out the ramp rate in Activation Method 5, which is shown in FIGS. 8A-8B. Using this technique, the activation process could run unattended without any danger of runaway exotherm temperatures causing damage to the activation vessel or the chromium catalyst.

Table 2 summarizes Activation Methods 1-5. The weight of charged pre-catalyst is shown, along with the weight of catalyst recovered after the activation and the percent recovery. This difference between the charged weight and recovered weight is due to the burning off of organic volatiles, which causes the exotherm. Also shown are the starting (ignition) temperature and final (maximum) temperature under nitrogen for the exotherm portion of the activation, and the average ramp rate, again as calculated over the period of the exotherm.

The catalysts from Activation Methods 1-5 were then used to polymerize ethylene. Table 3 shows the catalyst charge weight for each polymerization experiment, the amount of polymer produced, and the total time as well as the induction time, from which the activity was calculated. Also shown in Table 3 are the MI, I10, and high load melt index (HLMI). For reference, the Comparative catalyst described above was also tested simultaneously several times and is shown in Table 3. Of particular note, the inventive catalysts from Activation Methods 1-5 performed comparable to the Comparative catalyst, exhibiting similar activity and superior polymer properties (e.g., higher HLMI).

The amount of Cr(VI) was determined by mixing 2 g of the catalyst with 20 mL of a solution of 2 M $H_2SO_4$, then adding 5 drops of ferroin Fe(+3) indicator. This usually turns the mixture a blue-green color indicating the presence of Fe(III) ions. Next, the mixture was titrated to the ferroin endpoint (red color) using a solution of ferrous ammonium sulfate, which had been previously calibrated by reaction with a standardized 0.1 M sodium dichromate solution. When the mixture turned red, the end point was reached, the titrant volume was recorded, and the oxidation capacity of the catalyst was calculated and expressed as wt. % Cr(VI).

The lab-activated and large scale activated catalysts were tested in polymerization experiments using a 2.2-L steel reactor equipped with a marine stirrer rotating at 500 rpm. The reactor was surrounded by a steel jacket through which was passed a mixture of steam and water, which was adjusted to maintain a constant temperature of 105° C. (+/−0.5° C.) with the help of electronic control instruments. Unless otherwise stated, a small amount (0.01 to 0.10 g normally) of the solid catalyst was first charged under nitrogen to the dry reactor. Next, 1.2 L of isobutane liquid was charged and the reactor heated up to the specified temperature (105° C.). Finally, ethylene was added to the reactor to equal a fixed pressure, 550 psig, which was maintained during the experiment. The stirring was continued until about 3000 grams of polymer were produced per gram of catalyst, and the instantaneous reaction rate was noted by recording the flow of ethylene into the reactor to maintain the set pressure.

After the desired productivity, 3000 g/g, had been reached, the ethylene flow was stopped, and the reactor slowly depressurized and opened to recover a granular polymer powder. In all cases, the reactor was clean with no indication of any wall scale, coating, or other forms of fouling. The polymer powder was then removed and weighed. Activity was specified as g of polymer produced per g of solid catalyst charged per hr.

The melt index and high load melt index were then obtained on the recovered polymer. Melt Index (MI, $I_2$, g/10 min) was determined in accordance with ASTM D1238-E, condition 190/2, at 190° C. with a 2.16 kg weight, and I10 (g/10 min) was determined in accordance with ASTM D1238 at 190° C. with a 10 kg weight. High load melt index (HLMI, $I_{21}$, g/10 min) was determined in accordance with ASTM D1238-F, Condition 190/21.6, at 190° C. with a 21.6 kg weight. Density was determined in grams per cubic centimeter (g/cm$^3$) on a compression molded sample, cooled at 15° C. per minute, and conditioned for 40 hours at room temperature in accordance with ASTM D1505 and ASTM D4703.

TABLE 2

| Method | Type | Cycles | Charged (lb) | Recovered (lb) | Recovery (wt. %) | Ignition Temp (° F.) | Exotherm time (min) | Max Temp (° F.) | Exotherm Ramp (° F./min) |
|---|---|---|---|---|---|---|---|---|---|
| 1 | Manual | 2 | 625 | 450 | 72.0 | 450 | 73 | 879 | 5.88 |
| 2 | Manual | 2 | 625 | 506 | 81.0 | 430 | 75 | 875 | 5.93 |
| 3 | Manual | 11 | 625 | 496 | 79.4 | 430 | 75 | 841 | 5.48 |
| 4 | Manual | 9 | 625 | 500 | 80.0 | 450 | 61 | 843 | 6.44 |
| 5 | Automatic | 19 | 625 | 440 | 70.4 | 440 | 116 | 802 | 3.12 |

TABLE 3

| Example | Cr(VI) (wt. %) | Charge (g) | Time (min) | Ind time (min) | Polymer (g) | Activity (g/g/hr) | MI (dg/min) | I10 (dg/min) | HLMI (dg/min) |
|---|---|---|---|---|---|---|---|---|---|
| Comparative | 0.832 | 0.077 | 53.1 | 7.5 | 230 | 3914 | 0.43 | 6.6 | 30.9 |
| 1 | 0.868 | 0.109 | 50.7 | 1.5 | 344 | 3823 | 0.46 | 8.3 | 40.5 |
| Comparative | 0.832 | 0.066 | 56.4 | 7.2 | 209 | 3854 | 0.34 | 5.5 | 26.2 |
| 2 | 0.850 | 0.096 | 73.6 | 4.2 | 295 | 2655 | 0.60 | 9.4 | 44.9 |
| 3 | 0.881 | 0.057 | 48.2 | 4.1 | 171 | 4053 | 0.38 | 7.0 | 34.7 |
| Comparative | 0.832 | 0.072 | 59.6 | 8.5 | 221 | 3607 | 0.33 | 5.6 | 26.0 |
| 4 | 0.813 | 0.098 | 77.0 | 4.8 | 314 | 2661 | 0.43 | 7.5 | 36.1 |
| 5 | 0.907 | 0.061 | 77.0 | 11.5 | 189 | 2830 | 0.38 | 7.1 | 35.0 |
| Comparative | 0.832 | 0.059 | 58.6 | 11.0 | 177 | 3797 | 0.35 | 5.5 | 25.7 |
| 1 | 0.868 | 0.075 | 68.0 | 5.2 | 243 | 3092 | 0.37 | 6.7 | 33.0 |
| Comparative | 0.832 | 0.061 | 54.4 | 8.8 | 193 | 4199 | 0.29 | 5.0 | 23.7 |
| 2 | 0.850 | 0.082 | 61.8 | 4.9 | 241 | 3120 | 0.46 | 7.9 | 38.6 |

Catalysts activated by inventive methods 3-5 were then used in a large-scale 18,000 gallon loop reactor using isobutane diluent to make a series of polymers having a density of about 0.938 g/cc and a melt index of about 0.2 g/10 min. Table 4 below shows the reaction conditions. The Comparative catalyst was the Comparative catalyst described above and the Inventive catalyst was a mixture of catalysts produced in Activation Methods 3-5. Catalyst productivity and catalyst residue (ash) are summarized in Table 5 and, unexpectedly, the Inventive catalysts had significantly higher catalytic activity.

TABLE 4

| Catalyst | Inventive | Comparative |
|---|---|---|
| Rate, klb/h | 48.8 | 51.2 |
| Temp ° F. | 193.3 | 193.3 |
| Temp ° C. | 90 | 90 |
| Catalyst injection rate | 12.4 | 12.3 |
| C6=/C2=, lb/klb | 61.2 | 55.5 |
| Solids | 41.5% | 41.7% |
| C2 = concentration | 3.69 wt. % | 4.05 wt. % |
| H2 concentration | 0.65 mol % | 0.63 mol % |
| Rxn residence time | 44 min | 42 min |

TABLE 5

| Example | Polymer Ash (wt. %) | Productivity (g/g) |
|---|---|---|
| Comparative | 0.0257 | 3,888 |
| Inventive | 0.0174 | 5,755 |

In sum, Activation Methods 3-5 offer three advantages: (i) the controlled cycling or pulsing of nitrogen and air/oxygen stopped the runaway temperature that occurs during the exotherm, which can damage the activation vessel and the catalyst, making the chromium difficult to oxidize to Cr(VI); (ii) the controlled cycling or pulsing led to a dramatic reduction or elimination of organic emissions from the oxidation in which a noticeable odor was present during Methods 1-2, but was surprisingly completely absent in Methods 3-5; and (iii) the controlled cycling or pulsing improved catalytic activity.

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. An activation system comprising (a) a fluidized bed vessel having one or more heating zones and configured to fluidize and activate a supported chromium pre-catalyst, (b) one or more fluidizing gas inlets configured to introduce a fluidizing gas into the fluidized bed vessel, the fluidizing gas comprising (i) an inert gas, (ii) an oxygen-containing gas, or (iii) a mixture of the inert gas and the oxygen-containing gas, (c) one or more thermocouples positioned inside the fluidized bed vessel for measuring an activation temperature inside the fluidized bed vessel, and (d) a controller configured to cycle the fluidizing gas between (i) the inert gas and (ii) the oxygen-containing gas or to adjust (iii) the mixture of the inert gas and the oxygen-containing gas, based on time intervals and/or based on the activation temperature measured by the one or more thermocouples.

Aspect 2. The system defined in aspect 1, wherein the inert gas comprises (or consists essentially of, or consists of) nitrogen, argon, or a combination thereof.

Aspect 3. The process defined in aspect 1 or 2, wherein the oxygen-containing gas comprises (or consists essentially of, or consists of) oxygen, air, a mixture of oxygen and an inert gas (e.g., nitrogen), a mixture of air and an inert gas (e.g., nitrogen), or a combination thereof, with any suitable vol % of oxygen, e.g., from 1 to 40 vol %, from 1 to 30 vol %, from 2 to 21 vol %, from 3 to 25 vol %, or from 4 to 10 vol %.

Aspect 4. The system defined in any one of aspects 1-3, wherein the fluidized bed vessel has two or more heating zones.

Aspect 5. The system defined in any one of aspects 1-4, wherein the system comprises two or more thermocouples.

Aspect 6. The system defined in any one of aspects 1-5, wherein the one or more fluidizing gas inlets comprise an inert gas inlet line and an oxygen-containing gas inlet line, and the controller is further configured to cycle between (1) introducing the inert gas into the fluidized bed vessel through the inert gas inlet line by opening a first valve on the inert gas inlet line and closing a second valve on the oxygen-containing gas inlet line and (2) introducing the oxygen-containing gas into the fluidized bed vessel through the oxygen-containing gas inlet line by opening the second value and closing the first valve.

Aspect 7. The system defined in any one of aspects 1-5, wherein the one or more fluidizing gas inlets comprise one fluidizing gas inlet, and the controller is further configured to cycle between (1) introducing the inert gas into the fluidizing gas inlet through an inert gas inlet line by opening a first valve on the inert gas inlet line and closing a second valve on an oxygen-containing gas inlet line, and (2) introducing the oxygen-containing gas into the fluidizing gas inlet through the oxygen-containing gas inlet line by opening the second value and closing the first valve.

Aspect 8. The system defined in any one of aspects 1-7, wherein the controller is further configured to adjust durations of feeding the inert gas independently ranging from 10 sec to 15 min and durations of feeding the oxygen-containing gas independently ranging from 10 sec to 15 min.

Aspect 9. The system defined in any one of aspects 1-8, wherein the controller is further configured to adjust an average duration of feeding the inert gas that is greater than that of an average duration of feeding the oxygen-containing gas.

Aspect 10. The system defined in any one of aspects 1-9, wherein the controller is further configured to adjust cycles of introducing the inert gas and introducing the oxygen-containing gas to maintain an average increase in the activation temperature from 0.5 to 10° F./min (0.3 to 6° C./min) in a temperature range from a lower temperature in the 250° F. to 700° F. (121° C. to 371° C.) range up to a higher temperature in the 700° F. to 950° F. (371° C. to 510° C.) range.

Aspect 11. The system defined in aspect 10, wherein the average increase in the activation temperature is from 1 to 5° F./min (0.6 to 3° C./min), from 1.5 to 4° F./min (0.8 to 2.2° C./min), or from 2 to 3.5° F./min (1 to 2° C./min).

Aspect 12. The system defined in any one of aspects 1-11, wherein the controller is further configured to adjust any suitable number of cycles of introducing the inert gas followed by introducing the oxygen-containing gas, or any number of cycles disclosed herein, e.g., from 5 to 50, from 5 to 40, from 5 to 30, from 6 to 50, from 6 to 40, from 6 to 25, from 7 to 40, from 7 to 25, from 10 to 50, from 10 to 25, or from 10 to 20.

Aspect 13. The system defined in any one of aspects 1-5, wherein the one or more fluidizing gas inlets comprise one fluidizing gas inlet, and the controller is further configured to adjust the mixture of the inert gas and the oxygen-containing gas in the fluidizing gas inlet by controlling a first flow rate of the inert gas through an inert gas inlet line into the fluidizing gas inlet and a second flow rate of the oxygen-containing gas through an oxygen-containing gas inlet line into the fluidizing gas inlet.

Aspect 14. The system defined in any one of aspects 1-5 or 13, wherein the controller is further configured to control relative amounts of the inert gas and the oxygen-containing gas in the mixture at any suitable vol % of oxygen, e.g., from 1 to 10 vol %, from 1 to 8 vol %, from 2 to 8 vol %, from 2 to 7 vol %, or from 3 to 6 vol %.

Aspect 15. The system defined in any one of aspects 1-5 or 13-14, wherein the controller is further configured to adjust the mixture of the inert gas and the oxygen-containing gas to maintain an average increase in the activation temperature from 0.5 to 10° F./min (0.3 to 6° C./min) in a temperature range from a lower temperature in the 250° F. to 700° F. (121° C. to 371° C.) range up to a higher temperature in the 700° F. to 950° F. (371° C. to 510° C.) range.

Aspect 16. The system defined in aspect 15, wherein the average increase in the activation temperature is from 1 to 5° F./min (0.6 to 3° C./min), from 1.5 to 4° F./min (0.8 to 2.2° C./min), or from 2 to 3.5° F./min (1 to 2° C./min).

Aspect 17. The system defined in any one of aspects 1-16, wherein the one or more fluidizing gas inlets are configured to introduce the fluidizing gas into the fluidized bed vessel at any suitable linear velocity or any linear velocity disclosed herein, e.g., from 0.05 to 0.6 ft/sec, from 0.05 to 0.3 ft/sec, from 0.1 to 0.4 ft/sec, from 0.2 to 0.5 ft/sec, from 0.2 to 0.4 ft/sec, or from 0.2 to 0.3 ft/sec.

Aspect 18. The system defined in any one of aspects 1-17, wherein the controller is further configured to determine an exothermic increase in the activation temperature measured by the one or more thermocouples, e.g., an increase of at least 30° F. (17° C.) within 5 min.

Aspect 19. The system defined in any one of aspects 1-18, wherein the controller is further configured to determine an exothermic increase in the activation temperature measured by the one or more thermocouples, e.g., the second derivative of temperature versus time being positive (acceleration of temperature versus time).

Aspect 20. The system defined in any one of aspects 1-19, wherein the system is configured to operate batchwise, or alternatively, continuously.

Aspect 21. The system defined in any one of aspects 1-20, wherein the supported chromium pre-catalyst has any suitable pore volume (total) or a pore volume (total) in any range disclosed herein (e.g., from 0.5 to 5 mL/g), any suitable BET surface area or a BET surface area in any range disclosed herein (e.g., from 100 to 700 m²/g), and any suitable average (d50) particle size or an average (d50) particle size in any range disclosed herein (e.g., from 10 to 500 microns).

Aspect 22. The system defined in any one of aspects 1-21, wherein the supported chromium pre-catalyst contains any suitable amount of chromium or an amount in any range disclosed herein, e.g., from 0.1 to 5 wt. % of chromium, based on the weight of the pre-catalyst.

Aspect 23. The system defined in any one of aspects 1-22, wherein the supported chromium pre-catalyst contains any suitable amount of titanium or an amount in any range disclosed herein, e.g., from 0.1 to 10 wt. % of titanium, based on the weight of the pre-catalyst.

Aspect 24. A process (to produce an activated (calcined) chromium catalyst, the process) comprising (1) exposing a pre-catalyst in a fluidized bed vessel to feed cycles of a second oxidizing gas and a second inert gas at a temperature T2 in a range from 250° F. to 700° F. (121° C. to 371° C.) to a temperature T3 in a range from 700° F. to 950° F. (371° C. to 510° C.), wherein a duration of each second oxidizing gas feed cycle independently is from 10 sec to 15 min (e.g., 20-30 sec), a duration of each second inert gas feed cycle independently is from 10 sec to 15 min (e.g., 4-5 min), an average duration of the second oxidizing gas feed cycles is less than an average duration of the second inert gas feed cycles, and an average temperature rate increase in step (1) is from 0.5 to 10° F./min (0.3 to 6° C./min) (e.g., 2-4° F./min), and (2) heating the pre-catalyst, while introducing a third inert gas or a third oxidizing gas into the fluidized bed vessel, to a temperature T4 in a range from 1000° F. to 1600° F. (538° C. to 871° C.) and holding the pre-catalyst at T4 in the third inert gas or the third oxidizing gas for a hold time t1 in a range from 1 hr to 15 hr.

Aspect 25. The process defined in aspect 24, wherein the second inert gas in each cycle of step (1) is the same or different and independently comprises (or consists essentially of, or consists of) nitrogen, argon, or a combination thereof.

Aspect 26. The process defined in aspect 24 or 25, wherein the second oxidizing gas in each cycle of step (1) is the same or different and independently comprises (or consists essentially of, or consists of) oxygen, air, a mixture of oxygen and an inert gas (e.g., nitrogen), a mixture of air and an inert gas (e.g., nitrogen), or a combination thereof, with any suitable vol % of oxygen, e.g., from 1 to 40 vol %, from 1 to 30 vol %, from 2 to 21 vol %, from 3 to 25 vol %, or from 4 to 10 vol %.

Aspect 27. The process defined in any one of aspects 24-26, wherein step (1) comprises any suitable number of cycles or any number of cycles disclosed herein, e.g., from 5 to 50, from 5 to 40, from 5 to 30, from 6 to 50, from 6 to 40, from 6 to 25, from 7 to 40, from 7 to 25, from 10 to 50, from 10 to 25, or from 10 to 20.

Aspect 28. The process defined in any one of aspects 24-27, wherein any suitable average temperature rate increase is utilized in step (1) or any average temperature rate increase disclosed herein, e.g., from 1 to 5° F./min (0.6 to 3° C./min), from 1.5 to 4° F./min (0.8 to 2.2° C./min), or from 2 to 3.5° F./min (1 to 2° C./min).

Aspect 29. A process (to produce an activated (calcined) chromium catalyst, the process) comprising (1) exposing a pre-catalyst in a fluidized bed vessel to a feed of a first dilute oxidizing gas at a temperature T2 in a range from 250° F. to 700° F. (121° C. to 371° C.) and up to and including a temperature T3 in a range from 700° F. to 950° F. (371° C. to 510° C.), wherein the first dilute oxidizing gas comprises from 1 to 10 vol % oxygen, and (2) heating the pre-catalyst, while introducing a third inert gas or a third oxidizing gas into the fluidized bed vessel, to a temperature T4 in a range from 1000° F. to 1600° F. (538° C. to 871° C.) and holding the pre-catalyst at T4 in the third inert gas or the third oxidizing gas for a hold time t1 in a range from 1 hr to 15 hr.

Aspect 30. The process defined in aspect 29, wherein any suitable temperature rate increase is utilized in step (1) or any average temperature rate increase disclosed herein, e.g., from 0.5 to 10° F./min (0.3 to 6° C./min), from 1 to 5° F./min (0.6 to 3° C./min), from 1.5 to 4° F./min (0.8 to 2.2° C./min), or from 2 to 3.5° F./min (1 to 2° C./min).

Aspect 31. The process defined in aspect 29 or 30, wherein the first dilute oxidizing gas contains any suitable vol % of oxygen, e.g., from 1 to 9 vol %, from 1 to 8 vol %, from 2 to 8 vol %, from 2 to 7 vol %, or from 3 to 6 vol %.

Aspect 32. The process defined in any one of aspects 24-31, further comprising prior to step (1), a step of loading and heating the pre-catalyst in a first inert gas to a temperature T1 in the fluidized bed vessel.

Aspect 33. The process defined in aspect 32, wherein the pre-catalyst is at a temperature from ambient to 120° F. (49° C.) before loading into the fluidized bed vessel.

Aspect 34. The process defined in aspect 32 or 33, wherein loading the pre-catalyst into the fluidized bed vessel occurs in from 1 to 10 portions of a total pre-catalyst amount.

Aspect 35. The process defined in aspect 34, wherein during loading of each portion of the total pre-catalyst amount, a temperature is maintained in a temperature range of from 300 to 600° F. (149° C. to 315° C.) or from 400 to 600° F. (204° C. to 315° C.).

Aspect 36. The process defined in aspect 34 or 35, wherein loading of each portion of the total pre-catalyst amount is stopped when the temperature drops below 400° F. (204° C.) or below 300° F. (149° C.).

Aspect 37. The process defined in any one of aspects 34-36, wherein loading of each portion of the total pre-catalyst amount is stopped when the pressure rises above 1 psig.

Aspect 38. The process defined in any one of aspects 32-37, wherein T1 is in any suitable range or any range disclosed herein, e.g., from 400° F. to 700° F. (204° C. to 371° C.), from 450° F. to 650° F. (232° C. to 343° C.), or from 500° F. to 600° F. (260° C. to 315° C.).

Aspect 39. The process defined in any one of aspects 24-38, wherein T2 is in any suitable range or any range disclosed herein, e.g., from 400° F. to 600° F. (204° C. to 315° C.), from 600° F. to 700° F. (315° C. to 371° C.), from 500° F. to 650° F. (260° C. to 343° C.), from 625° F. to 700° F. (329° C. to 371° C.), or from 575° F. to 675° F. (302° C. to 357° C.).

Aspect 40. The process defined in any one of aspects 24-39, wherein T3 is in any suitable range or any range disclosed herein, e.g., from 700° F. to 850° F. (371° C. to 454° C.), from 700° F. to 800° F. (371° C. to 427° C.), from 725° F. to 900° F. (385° C. to 482° C.), from 750° F. to 950° F. (399° C. to 510° C.), or from 750° F. to 850° F. (399° C. to 454° C.).

Aspect 41. The process defined in any one of aspects 24-40, wherein t1 is in any suitable range or any range disclosed herein, e.g., from 1 hr to 8 hr, from 2 hr to 10 hr, from 3 hr to 15 hr, from 3 hr to 8 hr, or from 4 hr to 6 hr.

Aspect 42. The process defined in any one of aspects 24-41, wherein any suitable heating rate is utilized in step (2) or any heating rate disclosed herein, e.g., from 1 to 5° F./min (0.6 to 3° C./min), from 1.5 to 4° F./min (0.8 to 2.2° C./min), or from 2 to 3.5° F./min (1 to 2° C./min).

Aspect 43. The process defined in any one of aspects 24-42, wherein T4 is in any suitable range or any range disclosed herein, e.g., from 1000° F. to 1300° F. (538° C. to 704° C.), from 1100° F. to 1600° F. (593° C. to 871° C.), from 1100° F. to 1400° F. (593° C. to 760° C.), from 1100° F. to 1300° F. (593° C. to 704° C.), or from 1200° F. to 1300° F. (649° C. to 704° C.).

Aspect 44. The process defined in any one of aspects 24-43, further comprising prior to step (1), determining if an exothermic increase in temperature is occurring in the fluidized bed vessel (e.g., an increase of at least 30° F. (17° C.) within 5 min or the second derivative of temperature versus time is positive), and then performing step (1).

Aspect 45. The process defined in any one of aspects 24-44, wherein the process further comprises a step of (3) cooling the pre-catalyst, while introducing a fourth inert gas into the fluidized bed vessel, to a temperature T5 in a range from 900° F. to 1200° F. (482° C. to 649° C.), wherein T5 is less than T4.

Aspect 46. The process defined in aspect 44, wherein any suitable cooling rate is utilized in step (3) or any cooling rate disclosed herein, e.g., from 1 to 4° F./min (0.6 to 2.2° C./min), from 1.5 to 3.5° F./min (0.8 to 2° C./min), or from 2 to 3° F./min (1 to 1.7° C./min).

Aspect 47. The process defined in aspect 45 or 46, wherein the process further comprises a step of (4) exposing the pre-catalyst to a fourth oxidizing gas in the fluidized bed vessel at T5 for a hold time t2 in a range from 30 min to 10 hr.

Aspect 48. The process defined in aspect 47, wherein t2 is in any suitable range or any range disclosed herein, e.g., from 30 min to 8 hr, from 1 hr to 10 hr, from 1 hr to 8 hr, from 2 hr to 6 hr, or from 3 hr to 5 hr.

Aspect 49. The process defined in aspect 47 or 48, wherein t2 is a period of time sufficient to form at least 30 wt. %, at least 50 wt. %, at 70 wt. %, or at least 80 wt. % chromium (VI), based on the amount of chromium on the activated (calcined) chromium catalyst.

Aspect 50. The process defined in any one of aspects 45-49, wherein T5 is in any suitable range or any range disclosed herein, e.g., from 900° F. to 1100° F. (482° C. to 593° C.), from 950° F. to 1150° F. (510° C. to 621° C.), from 1000° F. to 1200° F. (538° C. to 649° C.), or from 1000° F. to 1100° F. (538° C. to 593° C.).

Aspect 51. The process defined in any one of aspects 47-50, wherein the process further comprises a step of (5) cooling, while introducing a fifth oxidizing gas into the fluidized bed vessel, to a temperature T6 in a range from 500° F. to 700° F. (260° C. to 371° C.) to produce the activated (calcined) chromium catalyst.

Aspect 52. The process defined in aspect 51, wherein any suitable cooling rate is utilized in step (5) or any cooling rate disclosed herein, e.g., from 1 to 4° F./min (0.6 to 2.2° C./min), from 1.5 to 3.5° F./min (0.8 to 2° C./min), or from 2 to 3° F./min (1 to 1.7° C./min).

Aspect 53. The process defined in aspect 51 or 52, wherein the process further comprises a step of (6) purging the activated (calcined) chromium catalyst in a fifth inert gas in the fluidized bed vessel at T6 and cooling to ambient temperature.

Aspect 54. The process defined in aspect 53, wherein in step (6), the activated (calcined) chromium catalyst is purged with the fifth inert gas at T6 for a purge time t3 in any suitable range or any range disclosed herein, e.g., from 2 min to 20 hr, from 5 min to 12 hr, from 5 min to 5 hr, from 15 min to 4 hr, or from 30 min to 6 hr.

Aspect 55. The process defined in any one of aspects 51-54, wherein T6 is in any suitable range or any range disclosed herein, e.g., from 500° F. to 650° F. (260° C. to 343° C.), from 550° F. to 700° F. (288° C. to 371° C.), from 550° F. to 650° F. (288° C. to 343° C.), or from 600° F. to 675° F. (315° C. to 357° C.).

Aspect 56. The process defined in any one of aspects 51-55, wherein T6 is within 150° F. (83° C.), within 100° F. (56° C.), within 50° F. (28° C.), within 25° F. (14° C.), or within 10° F. (6° C.) of T1.

Aspect 57. The process defined in any one of aspects 24-56, wherein the first inert gas, the third inert gas, the fourth inert gas, and the fifth inert gas are the same or different and independently comprise (or consist essentially of, or consist of) nitrogen, argon, or a combination thereof.

Aspect 58. The process defined in any one of aspects 24-57, wherein the first oxidizing gas, the third oxidizing gas, the fourth oxidizing gas, and the fifth oxidizing gas are the same or different and independently comprise (or consist essentially of, or consist of) oxygen, air, a mixture of oxygen and an inert gas (e.g., nitrogen), a mixture of air and an inert gas (e.g., nitrogen), or a combination thereof, with any suitable vol % of oxygen, e.g., from 1 to 40 vol %, from 1 to 30 vol %, from 2 to 21 vol %, from 3 to 25 vol %, or from 4 to 10 vol %.

Aspect 59. The process defined in any one aspects 24-58, wherein the activated (calcined) catalyst has a melt index potential greater (by any suitable amount or any amount disclosed herein, e.g. at least 10% greater, at least 25% greater, at least 50% greater, at least 75% greater, or at least 100% greater) than that of an otherwise identical catalyst (or control catalyst) activated by exposure to an oxidizing atmosphere at a temperature of 1200° F. (649° C.) for a time period of 3 hr (or 8 hr), when measured via MI, HLMI, or both.

Aspect 60. The process defined in any one of aspects 24-59, wherein the activated (calcined) catalyst produces a polymer under standard polymerization conditions having a ratio of Mw/Mn (or Mz/Mw, or CY-a parameter) that is within 35% (or within 30%, 25%, 20%, 15%, 10%, or 5%) of the Mw/Mn (or Mz/Mw, or CY-a parameter) of a polymer produced using an otherwise identical catalyst (or control catalyst) activated by exposure to an oxidizing atmosphere at a temperature of 1200° F. (649° C.) for a time period of 3 hr (or 8 hr).

Aspect 61. The process defined in any one of aspects 24-60, wherein the activated (calcined) catalyst has a MI potential of at least 0.2, at least 0.3, at least 0.4, at least 0.5, at least 0.6, at least 0.7, at least 0.8, at least 0.9, at least 1, or at least 1.2 g/10 min.

Aspect 62. The process defined in any one of aspects 24-61, wherein the activated (calcined) catalyst has a HLMI potential of at least 20, at least 25, at least 30, at least 35, at least 40 at least 50, at least 60, at least 70, at least 80, or at least 100 g/10 min.

Aspect 63. The process defined in any one of aspects 24-62, wherein the activated (calcined) catalyst produces a polymer under standard polymerization conditions that has a total film gel count (or a catalyst particle gel count) of less than or equal to 100 gels per ft$^2$ of 25 micron thick film (or less than or equal to 80, or less than or equal to 60, or less than or equal to 40, or less than or equal to 30, or less than or equal to 20, or less than or equal to 10, or less than or equal to 5, gels per ft² of 25 micron thick film), wherein film gels encompass a size greater than 200 μm (and caused by catalyst particles for the catalyst particle gel count).

Aspect 64. The process defined in any one of aspects 24-63, wherein the pre-catalyst (or the activated catalyst) is contacted with gas streams in the fluidized bed vessel at any suitable linear velocity or any linear velocity disclosed herein, e.g., from 0.05 to 0.6 ft/sec, from 0.05 to 0.3 ft/sec, from 0.1 to 0.4 ft/sec, from 0.2 to 0.5 ft/sec, from 0.2 to 0.4 ft/sec, or from 0.2 to 0.3 ft/sec (batch or continuous).

Aspect 65. The process defined in any one of aspects 24-64, wherein the pre-catalyst (or the activated chromium catalyst) comprises a silica support and any suitable amount of chromium or an amount in any range disclosed herein, e.g., from 0.1 to 5 wt. %, from 0.2 to 5 wt. %, from 0.5 to 3 wt. %, from 0.5 to 2 wt. %, or from 0.5 to 1.5 wt. % of chromium, based on the weight of the respective catalyst.

Aspect 66. The process defined in aspect 65, wherein the pre-catalyst (or the activated chromium catalyst) further comprises any suitable amount of titanium or an amount in any range disclosed herein, e.g., from 0.1 to 10 wt. %, from 0.5 to 10 wt. %, from 1 to 10 wt. %, from 2 to 8 wt. %, or from 2 to 6 wt. % of titanium, based on the weight of the respective catalyst.

Aspect 67. The process defined in aspect 66, wherein the pre-catalyst (or the activated chromium catalyst) further comprises any suitable amount of nitrogen or an amount in any range disclosed herein, e.g., from 1 to 5, from 1.5 to 5, from 1.5 to 4.5, from 2 to 5, from 2 to 4, or from 2 to 3 mol nitrogen/mol titanium.

Aspect 68. The process defined in aspect 66 or 67, wherein the pre-catalyst further comprises any suitable amount of a carboxylate group/ligand or an amount in any range disclosed herein, e.g., from 1 to 5, from 1 to 4, from 1 to 3, from 1.5 to 5, from 1.5 to 4, or from 2 to 3 mol carboxylate/mol titanium.

Aspect 69. The process defined in any one of aspects 65-68, wherein the pre-catalyst further comprises any suitable amount of carbon or an amount in any range disclosed herein, e.g., from 0.5 to 10 wt. %, from 1 to 10 wt. %, from 1 to 5 wt. %, from 2 to 10 wt. %, from 2 to 8 wt. %, or from 2 to 6 wt. % of carbon, based on the weight of the catalyst.

Aspect 70. The process defined in any one of aspects 65-69, wherein the amount of chromium of the pre-catalyst in an oxidation state of +5 or less is at least 50 wt. %, at least 60 wt. %, at least 70 wt. %, at least 80 wt. %, at least 90 wt. %, or at least 95 wt. %, based on the total amount of chromium on the pre-catalyst.

Aspect 71. The process defined in any one of aspects 65-70, wherein the amount of chromium of the activated chromium catalyst in a hexavalent oxidation state is at least 40 wt. %, at least 50 wt. %, at least 60 wt. %, at least 70 wt. %, at least 80 wt. %, at least 90 wt. %, or at least 95 wt. %, based on the total amount of chromium on the activated chromium catalyst.

Aspect 72. The process defined in any one of aspects 24-71, wherein the pre-catalyst (or the silica support, or the activated chromium catalyst) has any suitable pore volume (total) or a pore volume (total) in any range disclosed herein, e.g., from 0.5 to 5 mL/g, from 1 to 5 mL/g, from 1 to 3 mL/g, or from 1.5 to 2 mL/g.

Aspect 73. The process defined in any one of aspects 24-72, wherein the pre-catalyst (or the silica support, or the activated chromium catalyst) has any suitable BET surface area or a BET surface area in any range disclosed herein, e.g., from 100 to 700 m²/g, from 200 to 600 m²/g, from 250 to 550 m²/g, or from 300 to 500 m²/g.

Aspect 74. The process defined in any one of aspects 24-73, wherein the pre-catalyst (or the silica support, or the activated chromium catalyst) has any suitable average (d50) particle size or an average (d50) particle size in any range disclosed herein, e.g., from 10 to 500 microns, from 30 to 130 microns, or from 40 to 70 microns.

Aspect 75. An olefin polymerization process comprising (I) performing the process to produce the activated (calcined) chromium catalyst defined in any one of aspects 24-74, and (II) contacting the activated (calcined) chromium catalyst and an optional co-catalyst with an olefin monomer and an optional olefin comonomer in a polymerization reactor system under polymerization conditions to produce an olefin polymer.

Aspect 76. The olefin polymerization process defined in aspect 75, wherein a co-catalyst is used, and the co-catalyst comprises any suitable co-catalyst or any co-catalyst disclosed herein, e.g., an aluminoxane co-catalyst, an organoaluminum co-catalyst, an organoboron co-catalyst, or any combination thereof.

Aspect 77. The olefin polymerization process defined in aspect 75 or 76, wherein the olefin monomer and the optional olefin comonomer independently comprise a $C_2$-$C_{20}$ alpha-olefin.

Aspect 78. The olefin polymerization process defined in any one of aspects 75-77, wherein the olefin monomer comprises ethylene.

Aspect 79. The olefin polymerization process defined in any one of aspects 75-78, wherein the activated chromium catalyst is contacted with ethylene and an olefin comonomer comprising a $C_3$-$C_{10}$ alpha-olefin.

Aspect 80. The olefin polymerization process defined in any one of aspects 75-79, wherein the activated chromium catalyst is contacted with ethylene and an olefin comonomer comprising 1-butene, 1-hexene, 1-octene, or a mixture thereof.

Aspect 81. The olefin polymerization process defined in any one of aspects 75-80, wherein the polymerization reactor system comprises a slurry reactor, a gas-phase reactor, a solution reactor, or a combination thereof.

Aspect 82. The olefin polymerization process defined in any one of aspects 75-81, wherein the polymerization reactor system comprises a loop slurry reactor.

Aspect 83. The olefin polymerization process defined in any one of aspects 75-82, wherein the polymerization reactor system comprises a single reactor.

Aspect 84. The olefin polymerization process defined in any one of aspects 75-82, wherein the polymerization reactor system comprises 2 reactors.

Aspect 85. The olefin polymerization process defined in any one of aspects 75-82, wherein the polymerization reactor system comprises more than 2 reactors.

Aspect 86. The olefin polymerization process defined in any one of aspects 75-85, wherein the olefin polymer comprises any olefin polymer disclosed herein.

Aspect 87. The olefin polymerization process defined in any one of aspects 75-86, wherein the olefin polymer comprises an ethylene homopolymer, an ethylene/1-butene copolymer, an ethylene/1-hexene copolymer, and/or an ethylene/1-octene copolymer.

Aspect 88. The olefin polymerization process defined in any one of aspects 75-87, wherein the polymerization conditions comprise a polymerization reaction temperature in a range from 60° C. to 120° C. and a reaction pressure in a range from 200 to 1000 psig (1.4 to 6.9 MPa).

Aspect 89. The olefin polymerization process defined in any one of aspects 75-88, wherein the polymerization conditions are substantially constant, e.g., for a particular polymer grade.

Aspect 90. The olefin polymerization process defined in any one of aspects 75-89, wherein no hydrogen is added to the polymerization reactor system.

Aspect 91. The olefin polymerization process defined in any one of aspects 75-89, wherein hydrogen is added to the polymerization reactor system.

Aspect 92. The olefin polymerization process defined in any one of aspects 75-91, wherein the process is performed at a productivity of from 2000 to 5000 g polymer per gram of catalyst, and/or at a space-time yield of greater than or equal to 2, 2.5, 2.8, 3, or 4 (lb/hr)/gal and/or less than or equal to 6, 5.5, or 5 (lb/hr)/gal, in a commercial loop reactor making at least a 0.947 g/cc density ethylene/1-hexene copolymer as determined by ISO 1183 part 2.

Aspect 93. The olefin polymerization process defined in any one of aspects 75-91, wherein the process is performed at a productivity of from 2000 to 5000 g polymer per gram of catalyst, and/or at a space-time yield of greater than or equal to 2, 2.5, 2.8, 3, or 4 (lb/hr)/gal and/or less than or equal to 6, 5.5, or 5 (lb/hr)/gal, in a commercial loop reactor making at least a 0.938 g/cc density ethylene/1-hexene copolymer as determined by ISO 1183 part 2.

We claim:

1. An activation system comprising:
    (a) a fluidized bed vessel having one or more heating zones and configured to fluidize and activate a supported chromium pre-catalyst;
    (b) one or more fluidizing gas inlets configured to introduce a fluidizing gas into the fluidized bed vessel, the fluidizing gas comprising (i) an inert gas, (ii) an oxygen-containing gas, or (iii) a mixture of an inert gas and an oxygen-containing gas;
    (c) one or more thermocouples positioned inside the fluidized bed vessel for measuring an activation temperature inside the fluidized bed vessel; and
    (d) a controller configured to cycle the fluidizing gas between (i) the inert gas and (ii) the oxygen-containing gas or to adjust (iii) the mixture of the inert gas and the oxygen-containing gas, based on time intervals and/or based on the activation temperature measured by the one or more thermocouples.

2. The system of claim 1, wherein:
    the one or more fluidizing gas inlets comprise an inert gas inlet line and an oxygen-containing gas inlet line; and
    the controller is further configured to cycle between:
    (1) introducing the inert gas into the fluidized bed vessel through the inert gas inlet line by opening a first valve on the inert gas inlet line and closing a second valve on the oxygen-containing gas inlet line; and
    (2) introducing the oxygen-containing gas into the fluidized bed vessel through the oxygen-containing gas inlet line by opening the second valve and closing the first valve.

3. The system of claim 1, wherein:
    the one or more fluidizing gas inlets comprise one fluidizing gas inlet; and
    the controller is further configured to cycle between:
    (1) introducing the inert gas into the fluidizing gas inlet through an inert gas inlet line by opening a first valve on the inert gas inlet line and closing a second valve on an oxygen-containing gas inlet line; and
    (2) introducing the oxygen-containing gas into the fluidizing gas inlet through the oxygen-containing gas inlet line by opening the second valve and closing the first valve.

4. The system of claim 1, wherein the controller is further configured to:
    adjust durations of feeding the inert gas independently ranging from 10 sec to 15 min, and durations of feeding the oxygen-containing gas independently ranging from 10 sec to 15 min;
    adjust an average duration of feeding the inert gas that is greater than that of an average duration of feeding the oxygen-containing gas;
    adjust cycles of introducing the inert gas and introducing the oxygen-containing gas to maintain an average increase in the activation temperature from 0.5 to 10° F./min, in a temperature range from a lower temperature in the 250° F. to 700° F. (121° C. to 371° C.) range up to a higher temperature in the 700° F. to 950° F. (371° C. to 510° C.) range;
    adjust a number of cycles of introducing the inert gas followed by introducing the oxygen-containing gas in a range from 5 to 50; or
    any combination thereof.

5. The system of claim 1, wherein the controller is further configured to:
    adjust durations of feeding the inert gas independently ranging from 10 sec to 5 min, and durations of feeding the oxygen-containing gas independently ranging from 20 sec to 1 min; and/or
    adjust cycles of introducing the inert gas and introducing the oxygen-containing gas to maintain an average increase in the activation temperature from 1 to 5° F./min (0.6 to 3° C./min) in a temperature range from a lower temperature in the 250° F. to 700° F. (121° C. to 371° C.) range up to a higher temperature in the 700° F. to 950° F. (371° C. to 510° C.) range.

6. The system of claim 1, wherein:
    the inert gas comprises nitrogen;
    the oxygen-containing gas comprises air;
    the fluidized bed vessel has two or more heating zones;
    the system comprises two or more thermocouples;
    the one or more fluidizing gas inlets are configured to introduce the fluidizing gas into the fluidized bed vessel at a linear velocity of from 0.05 to 0.6 ft/see; or
    any combination thereof.

7. The system of claim 1, wherein:
    the one or more fluidizing gas inlets comprise one fluidizing gas inlet; and
    the controller is further configured to adjust the mixture of the inert gas and the oxygen-containing gas in the fluidizing gas inlet by controlling a first flow rate of the inert gas through an inert gas inlet line into the fluidizing gas inlet and a second flow rate of the oxygen-containing gas through an oxygen-containing gas inlet line into the fluidizing gas inlet.

8. The system of claim 7, wherein the controller is further configured to:
    control relative amounts of the inert gas and the oxygen-containing gas in the mixture at a vol % of oxygen from 1 to 10 vol %; and
    adjust the mixture of the inert gas and the oxygen-containing gas to maintain an average increase in the activation temperature from 0.5 to 10° F./min (0.3 to 6° C./min) in a temperature range from a lower temperature in the 250° F. to 700° F. (121° C. to 371° C.) range up to a higher temperature in the 700° F. to 950° F. (371° C. to 510° C.) range.

9. The system of claim 1, wherein the controller is further configured to determine an exothermic increase in the activation temperature measured by the one or more thermocouples.

10. A process comprising:
(1) exposing a pre-catalyst in a fluidized bed vessel to feed cycles of a second oxidizing gas and a second inert gas at a temperature T2 in a range from 250° F. to 700° F. (121° C. to 371° C.) to a temperature T3 in a range from 700° F. to 950° F. (371° C. to 510° C.), wherein:
a duration of each second oxidizing gas feed cycle independently is from 10 sec to 15 min;
a duration of each second inert gas feed cycle independently is from 10 sec to 15 min;
an average duration of the second oxidizing gas feed cycles is less than an average duration of the second inert gas feed cycles; and
an average temperature rate increase in step (1) is from 0.5 to 10° F./min (0.3 to 6° C./min); and
(2) heating the pre-catalyst, while introducing a third inert gas or a third oxidizing gas into the fluidized bed vessel, to a temperature T4 in a range from 1000° F. to 1600° F. (538° C. to 871° C.) and holding the pre-catalyst at T4 in the third inert gas or the third oxidizing gas for a hold time t1 in a range from 1 hr to 15 hr.

11. The process of claim 10, wherein:
the duration of each second oxidizing gas feed cycle independently is from 20 sec to 1 min; and/or
the duration of each second inert gas feed cycle independently is from 10 sec to 5 min.

12. The process of claim 10, wherein:
step (1) comprises from 5 to 50 cycles; and/or
the average temperature rate increase in step (1) is from 1 to 5° F./min (0.6 to 3° C./min).

13. The process of claim 10, further comprising prior to step (1), a step of loading and heating the pre-catalyst in a first inert gas to a temperature T1 in the fluidized bed vessel.

14. The process of claim 10, further comprising prior to step (1), determining if an exothermic increase in temperature is occurring in the fluidized bed vessel, and then performing step (1).

15. The process of claim 10, wherein the pre-catalyst comprises:
silica;
from 0.1 to 5 wt. % of chromium; and
optionally, from 0.1 to 10 wt. % of titanium.

16. The process of claim 10, wherein the process further comprises:
a step of (3) cooling the pre-catalyst, while introducing a fourth inert gas into the fluidized bed vessel, to a temperature T5 in a range from 900° F. to 1200° F. (482° C. to 649° C.), wherein T5 is less than T4; and
a step of (4) exposing the pre-catalyst to a fourth oxidizing gas in the fluidized bed vessel at T5 for a hold time t2 in a range from 30 min to 10 hr.

17. The process of claim 16, wherein the process further comprises:

a step of (5) cooling, while introducing a fifth oxidizing gas into the fluidized bed vessel, to a temperature T6 in a range from 500° F. to 700° F. (260° C. to 371° C.) to produce an activated chromium catalyst; and
a step of (6) purging the activated chromium catalyst in a fifth inert gas in the fluidized bed vessel at T6 and cooling to ambient temperature.

18. An olefin polymerization process comprising:
(I) performing the process of claim 17; and
(II) contacting the activated chromium catalyst and an optional co-catalyst with an olefin monomer and an optional olefin comonomer in a polymerization reactor system under polymerization conditions to produce an olefin polymer.

19. A process comprising:
(1) exposing a pre-catalyst in a fluidized bed vessel to a feed of a first dilute oxidizing gas at a temperature T2 in a range from 250° F. to 700° F. (121° C. to 371° C.) and up to and including a temperature T3 in a range from 700° F. to 950° F. (371° C. to 510° C.),
wherein the first dilute oxidizing gas comprises from 1 to 10 vol % oxygen; and
wherein an average temperature rate increase in step (1) is from 0.5 to 10° F./min (0.3 to 6° C./min); and
(2) heating the pre-catalyst, while introducing a third inert gas or a third oxidizing gas into the fluidized bed vessel, to a temperature T4 in a range from 1000° F. to 1600° F. (538° C. to 871° C.) and holding the pre-catalyst at T4 in the third inert gas or the third oxidizing gas for a hold time t1 in a range from 1 hr to 15 hr.

20. The process of claim 19, wherein:
the first dilute oxidizing gas contains from 2 to 7 vol % oxygen.

21. An olefin polymerization process comprising:
(I) performing the process of claim 19; and
(II) contacting the activated chromium catalyst and an optional co-catalyst with an olefin monomer and an optional olefin comonomer in a polymerization reactor system under polymerization conditions to produce an olefin polymer.

22. The process of claim 19, wherein the average temperature rate increase in step (1) is from 1 to 5° F./min (0.6 to 3° C./min).

23. The process of claim 22, wherein the pre-catalyst comprises:
silica;
from 0.1 to 5 wt. % of chromium; and
optionally, from 0.1 to 10 wt. % of titanium.

24. An olefin polymerization process comprising:
(I) performing the process of claim 23; and
(II) contacting the activated chromium catalyst and an optional co-catalyst with an olefin monomer and an optional olefin comonomer in a polymerization reactor system under polymerization conditions to produce an olefin polymer.

25. The process of claim 24, wherein the first dilute oxidizing gas contains from 2 to 7 vol % oxygen.

* * * * *